(12) United States Patent
Zhao et al.

(10) Patent No.: US 6,625,349 B2
(45) Date of Patent: Sep. 23, 2003

(54) EVANESCENT OPTICAL COUPLING BETWEEN A WAVEGUIDE FORMED ON A SUBSTRATE AND A SIDE-POLISHED FIBER

(75) Inventors: Shulai Zhao, Encinitas, CA (US); Bo Pi, Carlsbad, CA (US)

(73) Assignee: Oluma, Inc., Carlsbad, CA (US)

( * ) Notice: Subject to any disclaimer, the term of this patent is extended or adjusted under 35 U.S.C. 154(b) by 0 days.

(21) Appl. No.: 09/880,722

(22) Filed: Jun. 12, 2001

(65) Prior Publication Data

US 2002/0076150 A1 Jun. 20, 2002

Related U.S. Application Data

(63) Continuation-in-part of application No. 09/796,373, filed on Feb. 27, 2001.
(60) Provisional application No. 60/280,617, filed on Mar. 30, 2001, provisional application No. 60/214,686, filed on Jun. 27, 2000, and provisional application No. 60/214,589, filed on Jun. 27, 2000.

(51) Int. Cl.[7] .............................................. G02B 6/26
(52) U.S. Cl. ........................ 385/30; 385/15; 385/18; 385/31; 385/37; 385/39; 385/50
(58) Field of Search ............................... 385/15, 16, 18, 385/30, 31, 32, 37, 39, 50

(56) References Cited

U.S. PATENT DOCUMENTS

| 4,021,097 A | 5/1977 | McMahon |
| 4,136,929 A | 1/1979 | Suzaki |
| 4,259,016 A | 3/1981 | Schiffner |
| 4,301,543 A | 11/1981 | Palmer |
| 4,302,071 A | 11/1981 | Winzer |
| 4,307,933 A | 12/1981 | Palmer et al. |
| 4,315,666 A | 2/1982 | Hicks, Jr. |
| 4,378,539 A | 3/1983 | Swanson |
| 4,392,712 A | 7/1983 | Ozeki |
| 4,431,260 A | 2/1984 | Palmer |
| 4,479,701 A * | 10/1984 | Newton et al. ......... 350/96.16 |
| 4,493,528 A | 1/1985 | Shaw et al. |
| 4,536,058 A | 8/1985 | Shaw et al. |
| 4,556,279 A | 12/1985 | Shaw et al. |
| 4,560,234 A * | 12/1985 | Shaw et al. ............. 350/96.15 |
| 4,564,262 A | 1/1986 | Shaw |
| 4,601,541 A | 7/1986 | Shaw et al. |

(List continued on next page.)

FOREIGN PATENT DOCUMENTS

| DE | 28 12 346 A1 | 3/1978 |
| EP | 0178045 A1 | 4/1986 |
| FR | 2613844 A1 | 10/1988 |
| JP | 52-14430 A2 | 2/1977 |
| JP | 52-24539 | 2/1977 |
| JP | 53-91752 A2 | 8/1978 |
| JP | 54-4153 A2 | 1/1979 |

(List continued on next page.)

OTHER PUBLICATIONS

McCallion et al., "Side-polished fiber provides functionality and transparency," (Abstract) Laser Focus World, vol. 34, No. 9, p. S19–20, S22, S24, PennWell Publishing, Sep., 1998.

Das et al., "Automatic determination of the remiaining cladding thickness of a single-mode fiber half-coupler," (Abstract) Optics Letters, vol. 19, No. 6, p. 384–6, Mar. 15, 1994.

Ishikawa et al., "A new optical attenuator using the thermal diffusion of W–cladding fiber," (Abstract) MOC/GRIN '97 Technical Digest of the 6th Microoptics Conf./14th Topical Meeting on Gradient–Index Optical Systems in Tokyo, Japan, p. (vii+432+27), 208–11, Oct. 1997.

(List continued on next page.)

Primary Examiner—Akm Enayet Ullah
Assistant Examiner—Jennifer Doan
(74) Attorney, Agent, or Firm—Fish & Richardson P.C.

(57) ABSTRACT

Techniques for coupling optical energy between a side-polished port of a fiber in one substrate and a coupling port of a waveguide in another substrate.

39 Claims, 20 Drawing Sheets

U.S. PATENT DOCUMENTS

| | | | |
|---|---|---|---|
| 4,688,882 A | | 8/1987 | Failes |
| 4,721,352 A | * | 1/1988 | Sorin et al. ............... 350/96.15 |
| 4,723,827 A | * | 2/1988 | Shaw et al. ............... 350/96.15 |
| 4,778,237 A | * | 10/1988 | Sorin et al. ............... 350/96.15 |
| 4,784,453 A | * | 11/1988 | Shaw et al. ............... 350/96.16 |
| 4,828,350 A | | 5/1989 | Kim et al. |
| 4,842,358 A | * | 6/1989 | Hall ........................ 350/96.15 |
| 4,869,567 A | | 9/1989 | Millar et al. |
| 4,896,932 A | | 1/1990 | Cassidy |
| 4,900,118 A | | 2/1990 | Yanagawa et al. |
| 4,986,624 A | | 1/1991 | Sorin et al. |
| 4,991,922 A | | 2/1991 | Dahlgren |
| 5,029,961 A | | 7/1991 | Suzuki et al. |
| 5,042,896 A | | 8/1991 | Dahlgren |
| 5,100,219 A | | 3/1992 | Takahashi |
| 5,329,607 A | | 7/1994 | Kamikawa et al. |
| 5,444,723 A | | 8/1995 | Chandonnet et al. |
| 5,533,155 A | | 7/1996 | Barberio et al. |
| 5,586,205 A | | 12/1996 | Chen et al. |
| 5,623,567 A | | 4/1997 | Barberio et al. |
| 5,651,085 A | | 7/1997 | Chia |
| 5,710,849 A | * | 1/1998 | Little et al. ................... 385/50 |
| 5,729,641 A | | 3/1998 | Chandonnet et al. |
| 5,764,831 A | * | 6/1998 | Lauzon ........................ 385/43 |
| 5,781,675 A | | 7/1998 | Tseng et al. |
| 5,809,188 A | | 9/1998 | Tseng et al. |
| 5,841,926 A | | 11/1998 | Takeuchi et al. |
| 5,854,864 A | | 12/1998 | Knoesen et al. |
| 5,892,857 A | | 4/1999 | McCallion |
| 5,900,983 A | | 5/1999 | Ford et al. |
| 5,903,685 A | | 5/1999 | Jones et al. |
| 5,915,063 A | | 6/1999 | Colbourne et al. |
| 5,940,556 A | | 8/1999 | Moslehi et al. |
| 5,963,291 A | | 10/1999 | Wu et al. |
| 5,966,493 A | | 10/1999 | Wagoner et al. |
| 5,970,201 A | | 10/1999 | Anthony et al. |
| 6,011,881 A | | 1/2000 | Moslehi et al. |
| 6,026,205 A | | 2/2000 | McCallion et al. |
| 6,038,359 A | | 3/2000 | Moslehi et al. |
| 6,052,220 A | | 4/2000 | Lawrence et al. |
| 6,058,226 A | | 5/2000 | Starodubov |
| 6,130,984 A | | 10/2000 | Shen et al. |
| 6,134,360 A | | 10/2000 | Cheng et al. |
| 6,144,793 A | | 11/2000 | Matsumoto et al. |
| 6,169,830 B1 | * | 1/2001 | Kewitsch et al. ............. 385/37 |
| 6,185,358 B1 | | 2/2001 | Park |
| 6,236,782 B1 | * | 5/2001 | Kewitsch et al. ............. 385/43 |

FOREIGN PATENT DOCUMENTS

| | | |
|---|---|---|
| JP | 54-8542 | 1/1979 |
| JP | 54-68651 | 1/1979 |
| JP | 54-101334 A2 | 8/1979 |
| JP | 54-118255 A2 | 9/1979 |
| JP | 56-85702 | 7/1981 |
| JP | 58-10701 | 1/1983 |
| JP | 60-131503 | 7/1985 |
| JP | 64-50003 | 2/1989 |
| JP | 1-130106 | 5/1989 |
| JP | 1-222205 | 9/1989 |
| JP | 1-255803 | 10/1989 |
| JP | 4-31801 | 2/1992 |
| WO | WO 87/03676 | 6/1987 |

OTHER PUBLICATIONS

Matejec et al., "Optical fiber with novel geometry for evanescent–wave sensing," (Abstract) Sensors and Actuators B, (Chemical), vol. B29, No. 1–3, p. 416–22, Elsevier Publishing, Oct. 1995.

Alonso et al., "Single–mode, optical–fiber sensors and tunable wavelength filters based on the resonant excitation of metal–clad modes," (Abstract) Applied Optics, vol. 33, No. 22, p. 5197–201, Aug. 1, 1994.

Tomita et al., "Leaky–mode loss of the second propagating mode in single–mode fibres with index well profiles," (Abstract) Applied Optics, vol. 24, No. 1, p. 1704–7, Jun. 1, 1995.

Leminger et al., "Determination of the variable core–to–surface spacing of single–mode fiber–coupler blocks," (Abstract) Optics Letters, vol. 12, No. 3, p. 211–13, Mar., 1987.

Morshnev et al., "A fiber thermo–optical attenuator," (Abstract) Source: Radiotekhnika i Elektronika, Translated in: Soviet Journal of Communications Technology & Electronics, vol. 30, No. 9, p. 148–50, Sep., 1985.

Takahashi Mitsuo, "Variable light attenuator of improved air–gap type with extremely low returning light," (Abstract) Conf. Record—IEEE Instrumentation and Measurement Tech. Conf. 2, p. 947–950, 1994.

Schmidt et al., "New design approach for a programmable optical attenuator," (Abstract) Hewlett–Packard Journal, v. 46, No. 1, p. 34–39, 1995.

Hayata et al., "Algebraically decaying modes of dielectric planar waveguides," Optics Letters, vol. 20, No. 10, p. 1131–32, May 15, 1995.

Vengsarkar et al., "Photoinduced refractive–index changes in two–mode, elliptical–core fibers: sensing applications," Optics Letters, vol. 16, No. 19, p. 1541–43, Oct. 1, 1991.

Pantchev et al., "Method of Refractive Index Profile Reconstruction from Effective Index of Planar Optical Monomode Waveguides: Application to Potassium Ion–Exchanged Waveguides," IEEE Journal of Quantum Electronics, vol. 29, No. 1, p. 154–60, Jan. 1993.

Ikeda et al., "Analysis of the Attenuation Ratio of MQW Optical Intensity Modulator for 1.55 $\mu$m Wavelength Taking Account of Electron Wave Function Leakage," IEEE Journal of Quantum Electronics, vol. 32, No. 2, p. 284–92, Feb. 1996.

S. Masuda, "Variable attenuator for use in single–mode fiber transmission systems," Applied Optics, vol. 19, No. 14, p. 2435–38, Jul. 15, 1980.

Huang et al., "Field–Induced Waveguides and Their Application to Modulators," IEEE Journal of Quantum Electronics, vol. 29, No. 4, p. 1131–1143, Apr. 1993.

Iztkovich et al., "In–Situ Investigation of Coupling Between a Fibre and a Slab Waveguide," Tel Aviv University, Israel, May 29, 1990.

Brierley et al., "Amplitude and phase characterization of polished directional half–couplers with variable refractive index overlays," Optical Engineering, vol. 27, No. 1, p. 045–49, Jan. 1988.

Scholl et al., "In–line fiber optical attenuator and powermeter," SPIE vol. 1792 Components for Fiber Optic Applications VII, p. 65–70, 1992.

Tsujimoto et al., "Fabrication of Low–Loss 3 dB Couplers With Multimode Optical Fibres," Electronics Letters, vol. 14, No. 5, Mar. 2, 1978.

* cited by examiner

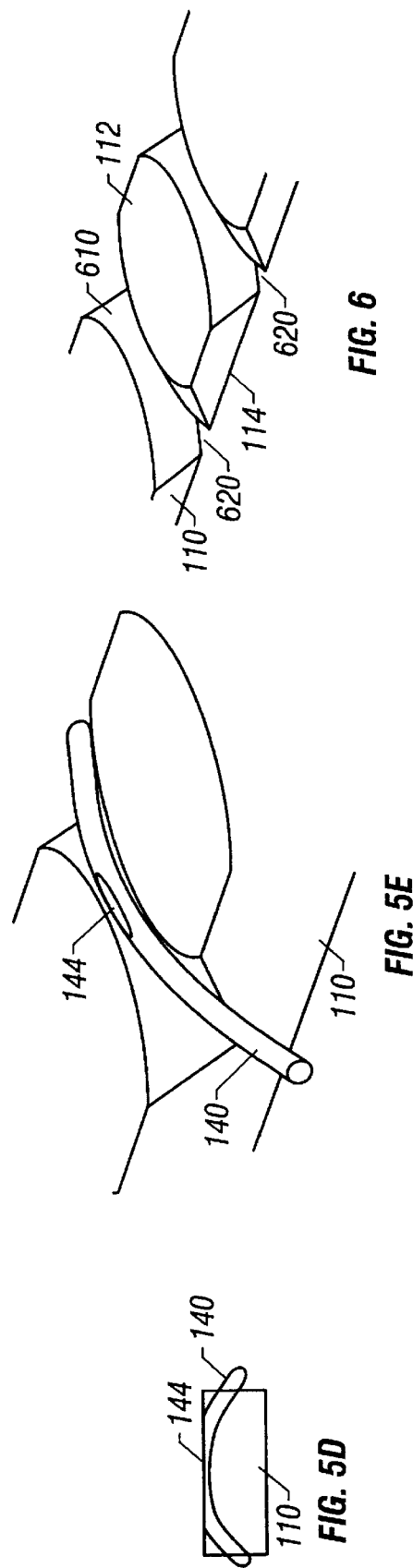

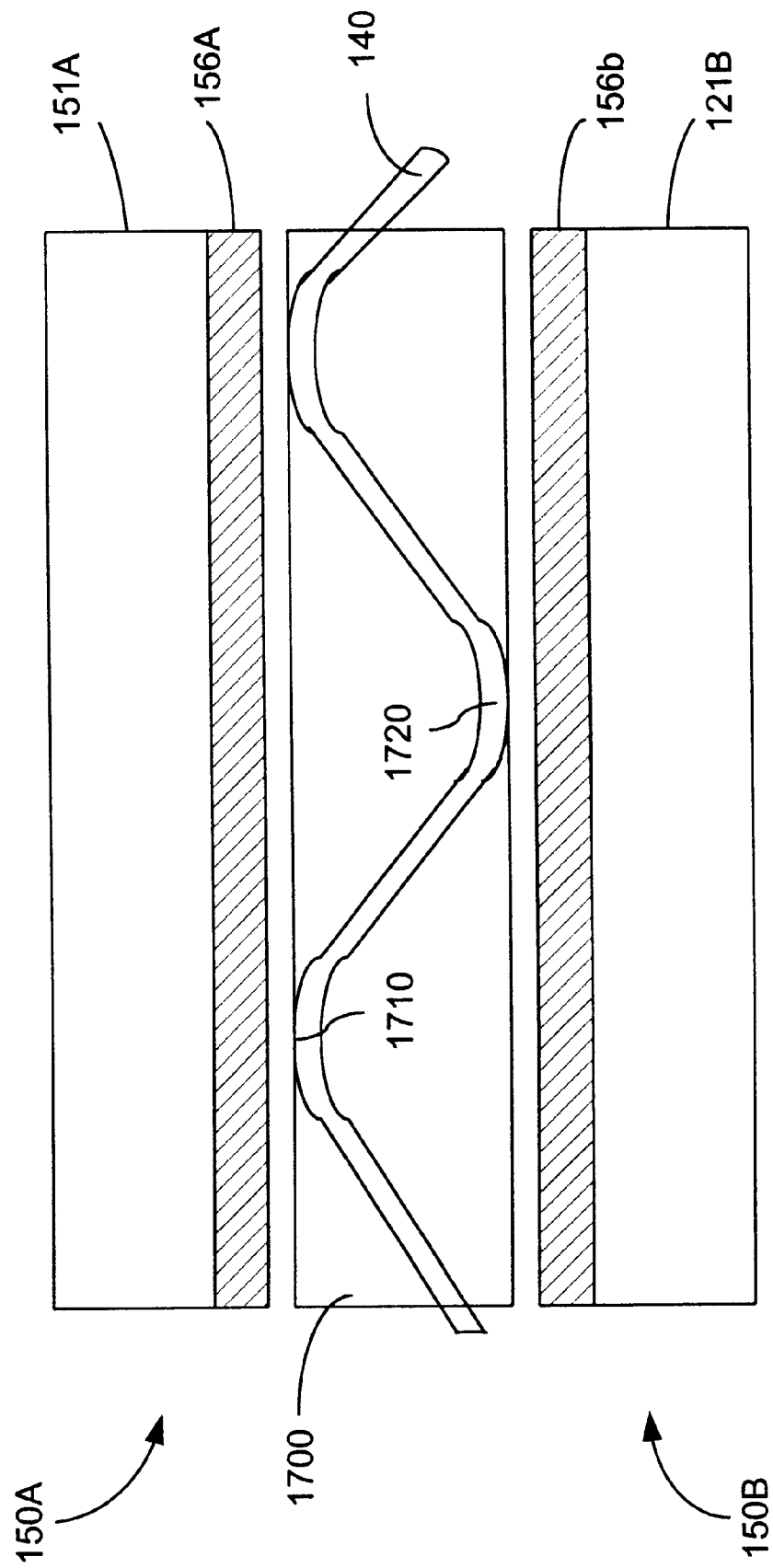

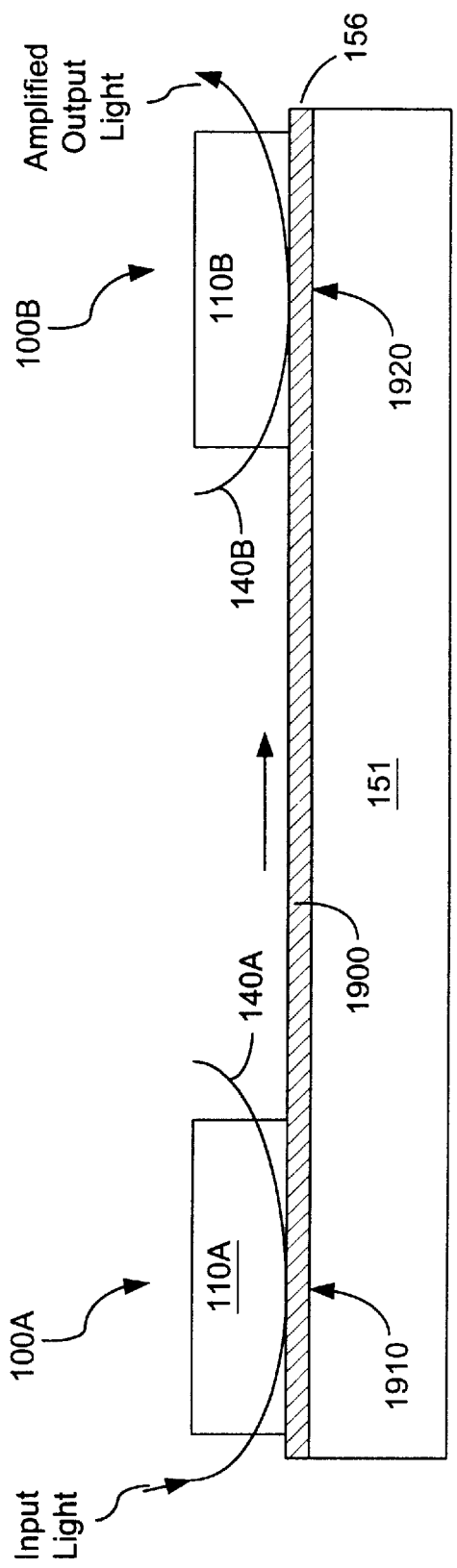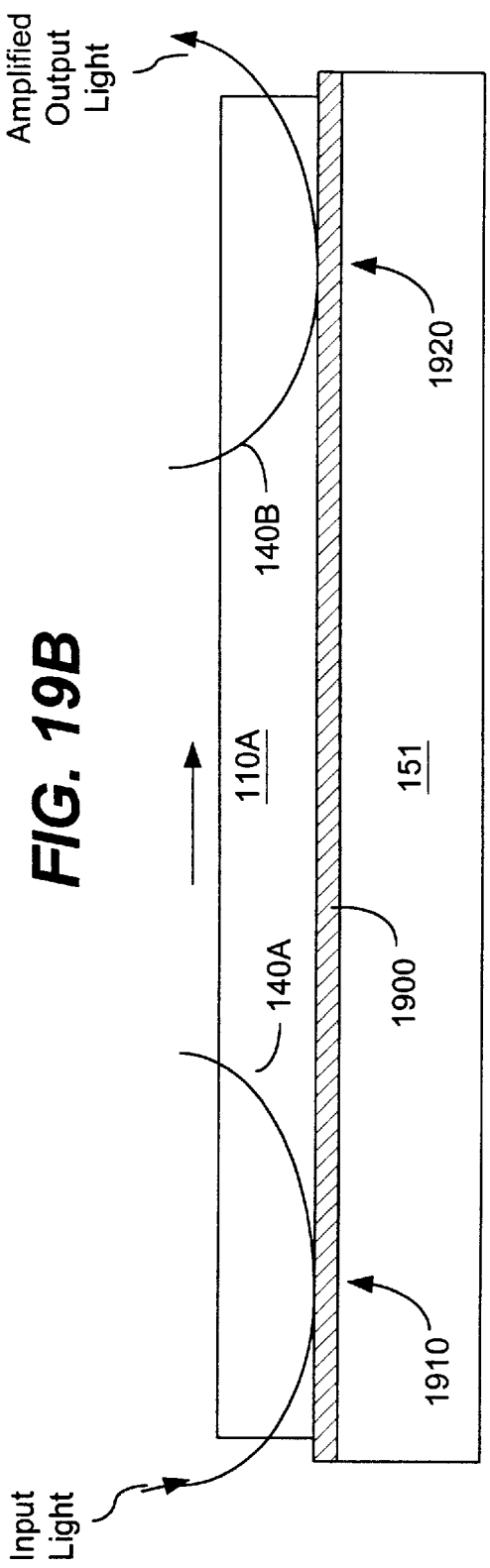

EVANESCENT OPTICAL COUPLING BETWEEN A WAVEGUIDE FORMED ON A SUBSTRATE AND A SIDE-POLISHED FIBER

This application is a continuation-in-part of U.S. application Ser. No. 09/796,373 entitled "INTEGRATION OF FIBERS ON SUBSTRATES FABRICATED WITH GROOVES" and filed Feb. 27, 2001, now U.S. Pat. No. 6,516,114. This application also claims the benefit of U.S. Provisional Application No. 60/280,617 entitled "TRANSVERSE OPTICAL COUPLING BETWEEN A FIBER AND A WAVEGUIDE" and filed Mar. 30, 2001. In addition, this application further claims benefit of U.S. Provisional Application Nos. 60/214,686 entitled "WAFER SCALE FIBER OPTIC DEVICE FABRICATION TECHNIQUE FOR MASS PRODUCTION", and 60/214,589 entitled "AN INTEGRATABLE FIBER OPTIC COUPLING TECHNIQUE," both of which were filed on Jun. 27, 2000.

BACKGROUND

This application relates to integration of optical waveguiding elements, such as optical fibers and planar waveguides on substrates to form various optical devices, and more particularly, to techniques and devices for coupling optical energy between a fiber and a waveguide.

Optical waves may be transported through optical waveguiding elements or "light pipes" such as optical fibers, or optical waveguides formed on substrates. A typical fiber may be simplified as a fiber core and a cladding layer surrounding the fiber core. The refractive index of the fiber core is higher than that of the fiber cladding to confine the light. Light rays that are coupled into the fiber core within a maximum angle with respect to the axis of the fiber core are totally reflected at the interface of the fiber core and the cladding. This total internal reflection provides a mechanism to spatially confine the optical energy of the light rays in one or more selected fiber modes to guide the optical energy along the fiber core. Optical waveguides formed on substrates can also be designed to provide spatial optical confinement based on total the internal reflection. Planar waveguides, for example, may be formed by surrounding a slab or strip of a dielectric material with one or more dielectric materials with refractive indices less than that of the dielectric slab or strip.

Optical fibers may be used in transmission and delivery of optical signals from one location to another in a variety of optical systems, including but not limited to, fiber devices, fiber links and fiber networks for data communications and telecommunications. Optical waveguides on substrates may be used in integrated optical devices where optical elements, opto-electronic elements, or MEMS elements are integrated on one or more substrates.

The guided optical energy in the fiber or waveguide, however, is not completely confined within the core of the fiber or waveguide. In a fiber, for example, a portion of the optical energy can "leak" through the interface between the fiber core and the cladding via an evanescent field that essentially decays exponentially with the distance from the core-cladding interface. The distance for a decay in the electric field of the guided light by a factor of e≈2.718 is about one wavelength of the guided optical energy. This evanescent leakage may be used to couple optical energy into or out of the fiber core, or alternatively, to perturb the guided optical energy in the fiber core.

SUMMARY

This application includes techniques for providing evanescent optical coupling between a fiber engaged to a first substrate and a waveguide formed in a second substrate. A portion of the fiber is embedded in an elongated groove in the first substrate and is side polished to form an optical coupling port by removing a portion of the fiber cladding. The first and the second substrates are positioned relative to each other so that the coupling port of the fiber is adjacent to the waveguide to allow for evanescent coupling between the fiber and the waveguide. A single fiber may be optically coupled to two or more waveguides through its different coupling ports located in grooves of the first substrate.

An optical grating may be formed to assist the above optical coupling between the fiber and the waveguide. The grating may be formed in the fiber cladding or the fiber core located in the coupling port of the fiber, in the waveguide, or between the fiber and the waveguide.

The fiber may be mounted and engaged to one or more grooves formed in a substrate in a fiber device. One embodiment of the fiber device includes a substrate that is formed with an elongated groove on one substrate surface, and two openings respectively at two ends of the groove formed through the substrate to extend between the two sides of the substrate. An optical fiber is engaged to the substrate by passing through the two openings. The fiber has at least first, second, and third contiguous fiber portions, where the second fiber portion is disposed in the elongated groove on one side of the substrate, and the first and third fiber portions are located on or over the opposite substrate surface. The fiber cladding in the second fiber portion may be at least partially removed to form an optical coupling port for the fiber. According to another embodiment, the fiber device may also be formed in a substrate that includes grooves formed on both opposing sides of the substrate so that two optical coupling ports may be formed in the fiber that are respectively located on two opposite sides of the substrate.

BRIEF DESCRIPTION OF THE DRAWINGS

FIGS. 4A, 4B, 5A, 5B, 5C, 5D, and 5E illustrate a process of fabricating V grooves in semiconductor substrates by anistropic etching.

FIG. 6 illustrates formation of openings in V grooves by anistropc etching.

FIGS. 15, 16, and 17 show embodiments for transverse coupling between a fiber and a waveguide.

FIGS. 19A and 19B show waveguide semiconductor amplifiers using two fiber-waveguide couplers as input and output ports.

DETAILED DESCRIPTION

Figure 1:
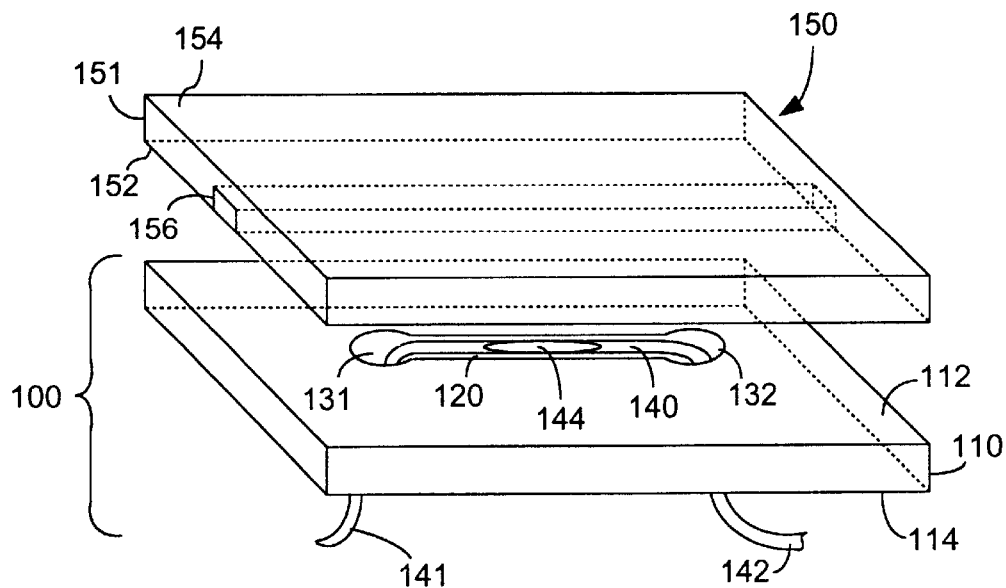
FIG. 1 shows one embodiment of an optical device in which a fiber is optically coupled to an optical planar waveguide through a fiber coupling port formed by removal of partial fiber cladding. The fiber is integrated in a fiber device that has a first substrate with a groove for positioning the fiber and openings for holding the fiber. The waveguide is integrated in a second substrate.

The techniques and devices described below are in part based on the recognition that evanescent optical coupling between a fiber and a waveguide may be used to construct a variety of fiber-compatible optical devices and systems with unique and versatile applications. For example, optical devices based on planar waveguide technology and optical devices based on fiber technology may be combined based on such evanescent optical coupling. A waveguide in this disclosure is construed as a non-fiber waveguide formed on a substrate which may include planar waveguides in various configurations, such as a one-dimensional planar waveguide (e.g., a slab waveguide), a two-dimensional planar waveguide (e.g., a channel waveguide and a ridged waveguide), and a three-dimensional planar waveguide (e.g., a waveguide region surrounded on all sides by a confining medium of lesser refractive index).

The evanescent optical coupling between the planar waveguide and the fiber may be accomplished by using a side-polished coupling port of the fiber. A portion of the fiber cladding of the fiber is removed and is polished to an optical quality to form this fiber coupling port. The polished surface is close to the fiber core so that the strength of the evanescent field outside the fiber core is sufficient for coupling fiber-guided optical energy out of the fiber. Under this configuration, an external optical field originated outside the fiber may also be coupled into the fiber core when external optical field physically reaches the fiber core through that fiber coupling port and matches a supported mode in the fiber. As described below, the fiber may be integrated or engaged to a substrate by engaging to one or more elongated grooves and fabricated to have an optical polish on the fiber coupling port. The waveguide may also be processed to form a coupling port by, e.g., removing or leaving a thin layer of cladding materials such as in a photolithography-based etching process. The coupling ports of the fiber and waveguide may be placed adjacent to or in contact with each other to transfer optical energy therebetween.

One of advantages of this evanescent coupling technique is the reduced insertion loss compared to a conventional end-to-end coupling between an end facet of the planar waveguide and an end facet of the fiber. The end-to-end coupling couples the energy between the fiber and the waveguide along their optical axes and can have significant loss due to the dissimilarity in the cross sectional geometries of the generally circular fiber core and the generally rectangular waveguide. The evanescent coupling can also reduce difficulty in the alignment of optic fiber to the planar waveguide compared to the end-to-end interconnection.

In addition, the evanescent coupling technique can allow novel interconnections between planar waveguides and fibers that would be difficult to achieve with end-to-end coupling scheme. For example, two planar waveguides formed on the same substrate may be coupled to exchange optical energy. A fiber may be coupled to one of the two waveguides to couple optical energy output that waveguide or inject an optical signal into the waveguide. This essentially provides a three-dimensional coupling scheme since the optical energy is transferred between different waveguides in the waveguide plane on the waveguide substrate and is transferred out of the waveguide plane to the fiber. As another example for the three-dimensional coupling, two or more layers of waveguides formed on different waveguide substrates may be stacked in the vertical dimension by using a fiber device to interconnect two adjacent layers of waveguides. In one implementation, a double-sided fiber module shown in FIG. 8C may be coupled two waveguide modules on its two surfaces to allow optical coupling between the two waveguide modules. Therefore, planar waveguide substrates can be stacked in various configurations. As a result, sophisticated optical circuitry can be formed, e.g., in configurations similar to circuits in printed circuit board technology.

FIG. 1 shows one embodiment of a device where a fiber 140 and a planar waveguide 156 are coupled via the evanescent coupling. The device in FIG. 1 includes a fiber module 100 where the fiber 140 is integrated or engaged to a substrate 110 and a waveguide module 150 where the waveguide 156 is fabricated in another substrate 151. The waveguide 156 as shown is an example of a two-dimensional planar waveguide which is buried in the substrate 151 as a channel waveguide so that all its sides except one are surrounded by the substrate 151. This channel waveguide geometry may be formed by various techniques, e.g., implanting proper dopants in the selected region of the substrate 151. The substrate 151 includes two parallel and opposing substrate surfaces, 152 and 154, that are generally flat and may be polished. The waveguide 156 is formed over the substrate surface 152 to interface with the fiber 140 in the fiber module 100. In this configuration, the substrate surface 152 and the exposes surface of the waveguide 156 are in the same plane and can be polished to form the waveguide coupling port. The waveguide module 150 and the fiber module 100 are oriented relative to each other so that the elongated groove 120 for holding the fiber 140 is substantially parallel to the optic axis of the waveguide 156.

The waveguide module 150 may include other optical, opto-electronic, or MEMS elements on the substrate 151 in addition to the planar waveguide 156. In particular, one or more additional waveguides may be formed in the substrate 151 to optically couple with the waveguide 156 so that a three-dimensional optical coupling can be achieved by both in-plane coupling between the waveguide 156 and other waveguides and out-of-plane coupling between the fiber 140 and the waveguide 156. Coupling between two different waveguides formed on the same side of the substrate 151 is well known in the art.

Figure 2A:
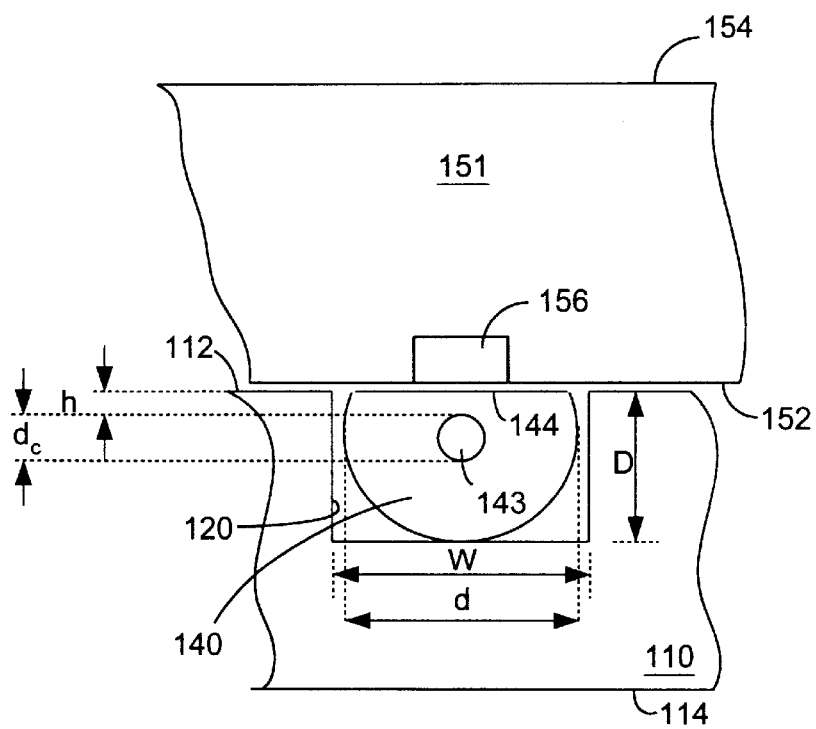
FIG. 2A shows a cross sectional view of the device in FIG. 1.
Figure 2B:
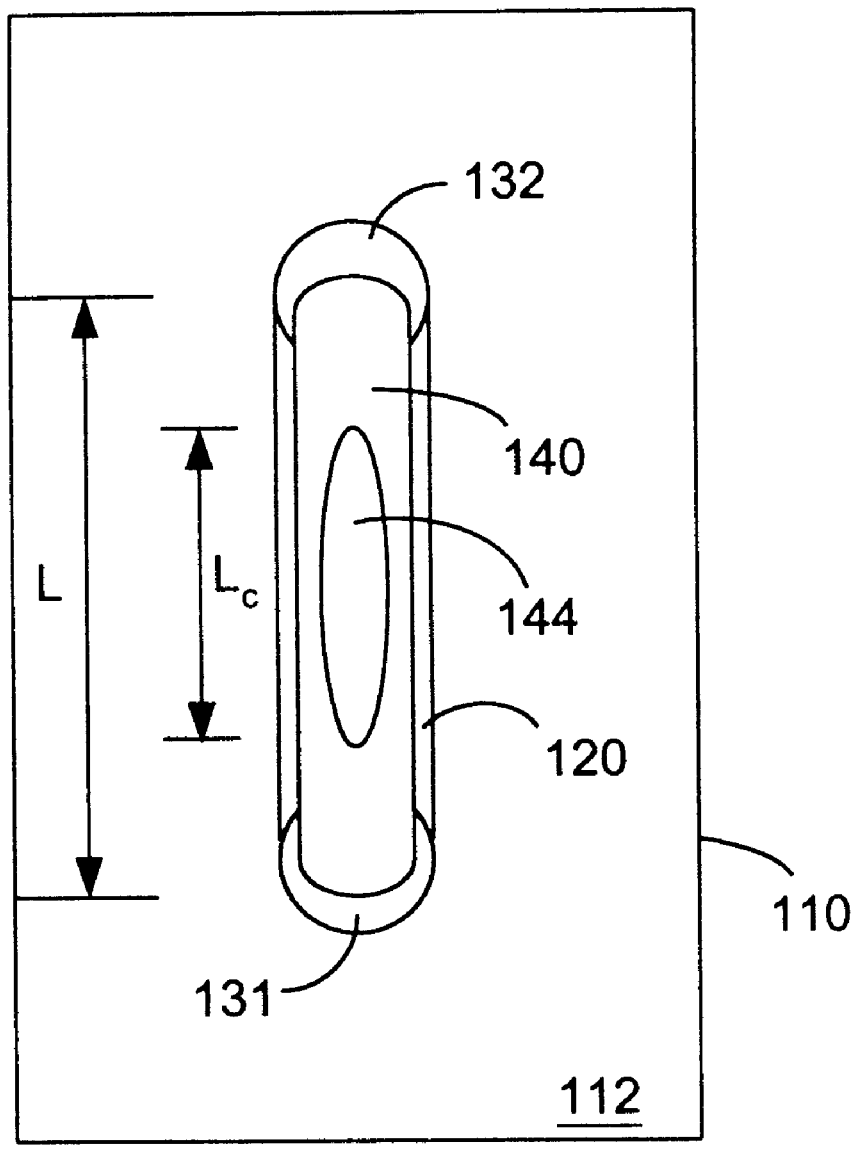
FIG. 2B shows a top view of the fiber device in FIG. 1.

The fiber device 100 in this application may be viewed as a "half" fiber coupler in that it provides only one half of the coupling mechanism between the fiber 140 and the waveguide 156. The waveguide module 150 provides a half waveguide coupler to be paired with the half fiber coupler. FIGS. 2A and 2B show additional details of the fiber device 100 according to one embodiment. Other embodiments of the fiber device 100 are also disclosed in the following sections.

The substrate 110 may be formed of various materials, such as semiconductors, insulators including dielectric materials (e.g., a glass, a quartz, a crystal, etc), metallic materials, or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

Figure 3A:
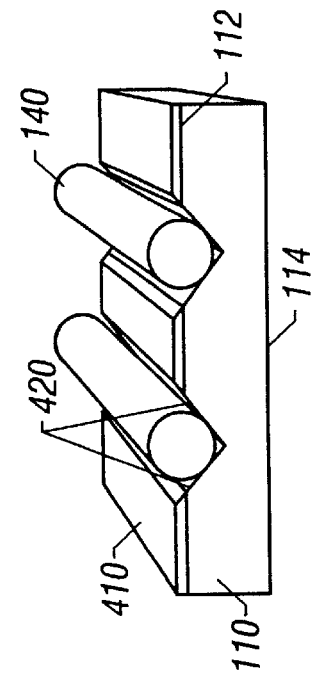
FIGS. 3A and 3B show examples of two different cross sections for grooves shown in FIG. 1.

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 310 in FIG. 3B. The cross sections are generally not so limited and may also be other shapes as well, including rectangular as shown in FIG. 2A, U-shaped as shown by the groove 310 in FIG. 3A, a circularly shape or other suitable shapes.

The width, W, of the groove 120 is generally greater than the diameter, d, of the fiber 140 and may either remain a constant or vary spatially along the groove 120, e.g., increasing from the center towards the two ends. The length, L, of the groove 120 may vary from one grove to another and can be determined based on specific requirements of applications. The depth D of the groove 120 may be a constant or may vary along the groove 120, e.g., increasing from the center towards the two ends. In general, at least a portion of the groove 120 has a depth D to expose a portion of the fiber cladding of the fiber 140 above the surface 112 while still keeping the fiber core below the surface 112. Sometimes, the depth D of the groove 120 may also be selected to expose the fiber core. Other portions of the groove 120 may have a different depth so that the fiber can be placed within the groove 120 under the substrate surface 112. Depending on the geometry of the groove 120 (e.g., the apex angle of a V-shaped groove), the depth D of the entire groove 120 may be greater than fiber diameter d. For a groove with a rectangular cross section as shown in FIG. 2A, at least a portion of the groove 120 has a depth D less than the fiber diameter d but greater than the sum of the fiber radius r=d/2 and radius of the fiber core $r_c=d_c/2$. This portion of the groove 120 exposes partial fiber cladding of the fiber 140 above the surface 112 while still keeping the fiber core below the surface 112. Other portions of the groove 120 may have a depth that is at least the fiber diameter d so that the fiber can be essentially placed in the groove 120 below the surface 112. However, in certain applications such as the device shown in FIG. 12, the depth D of the entire groove 120 may be greater than fiber diameter d. Unless otherwise indicated, the following description will assume that at least a portion of a groove 120 to expose a portion of the fiber cladding above the surface 112 and adjacent portions sufficiently deep to keep the fiber below the surface 112. In case of the rectangular groove 120, the central portion of the groove 120 may have a depth D less than d but greater than (d+dc)/2 while the portions on either sides of the central portion may have a depth equal to or greater than the fiber diameter d.

Notably, the fiber device 100 includes two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed and polished to form a flat surface 144 of a length Lc that is above the fiber core 143 and is substantially coplanar with the surface 112 of the substrate 110. When the spacing, h, between the flat surface 144 and the fiber core 142 is sufficiently small (e.g., on the order of one wavelength or less), the flat surface 144 can be used to couple optical energy into or out of the fiber core 144 through the evanescent fields outside the fiber core. Hence, the length, Lc, of the flat surface 144 approximately represents the optical coupling length for the fiber device 100.

FIG. 2A further shows that the waveguide module 150 is positioned with the substrate surface 152 facing the substrate surface 112 to place the coupling port of the waveguide 150 adjacent to the fiber coupling port 144. The waveguide 156 is in the evanescent field of the optical signal in the fiber core 143. The surface 152 may be directly in contact with the surface 152 or spaced from the surface 152 by an order of magnitude of or less than one wavelength of the optical signal.

Figure 3B:
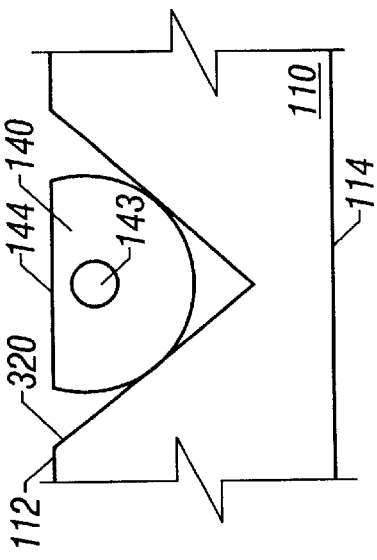
Figure 4A:
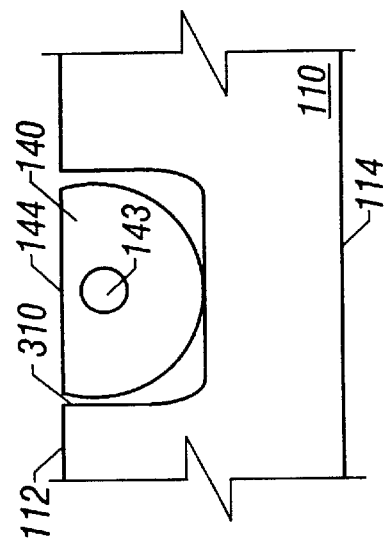
Figure 4B:
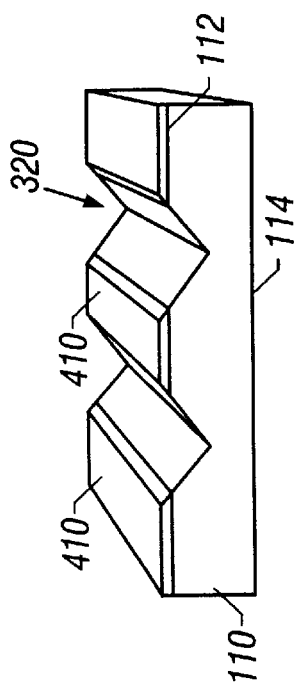

FIGS. 4A and 4B illustrate the fabrication of the V groove 320 and placement of the fiber 140 in the V groove 320 as shown in FIG. 3B. First, a mask layer 410 is deposited over the surface 112 of the substrate 110 and is patterned by a suitable technique such as a photolithography process to have one or more groove areas exposing the underlying substrate 110. Next, the exposed portions of the substrate 110 are anistropically etched to form V grooves.

If the substrate 110 is formed of a semiconductor, e.g., silicon, a thermally-grown silicon oxide or nitride film may be used as the etching mask 410 for anisotropic silicon etching. When the surface 112 is in the crystalline plane (100) of the Si substrate 110 and the groove patterns in the etching mask 410 are parallel to the crystalline plane (110), an etchant chemical such as alkaline (KOH) can be applied on the silicon (100) surface to produce truncated v-shaped grooves. Since the anisotropic etching is stopped at the crystalline plane (111), the dimension of the V grooves, such as the groove width and depth can be accurately controlled by properly selecting the dimension of the groove patterns formed in the etching mask 410.

Referring to FIG. 4B, after the grooves 320 are formed, the fibers 140 can be placed in the grooves 320 and bonded to the groves 320 at locations 420. The bonding may be implemented by a number of techniques, including but not limited to using an epoxy, glass frit thermal bond, or $CO_2$ assisted thermal bond. When multiple grooves 320 are formed, an array of fibers 140 can be precisely aligned in the grooves 320 with a predetermined spacing. The exposed cladding of the fiber 140 can then be removed and polished to form the flat surface 144 as shown in FIG. 3B.

Figure 5C:
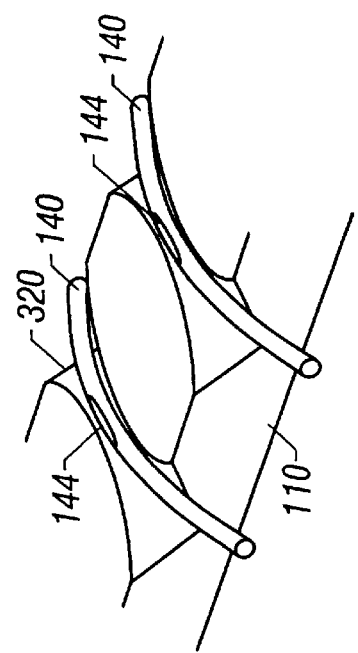
Figure 5B:
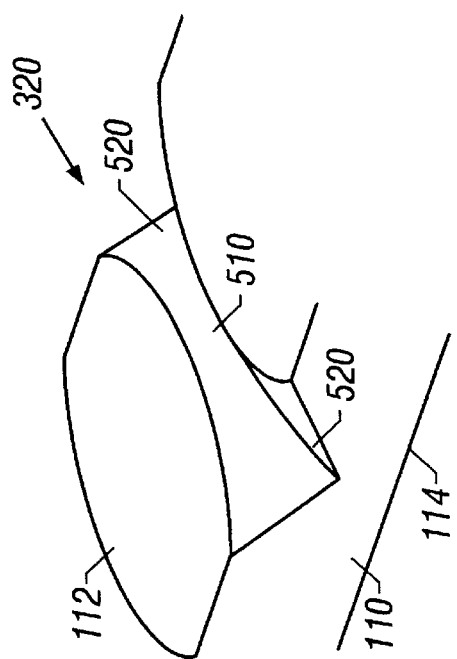
Figure 5A:
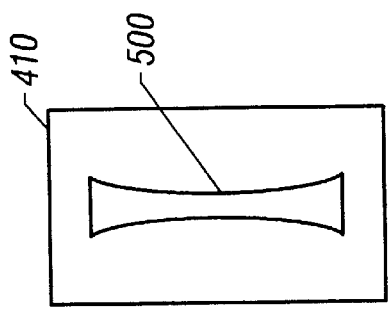

FIG. 5A shows one exemplary groove pattern 500 formed in the etching mask layer 430 in FIG. 4A. FIG. 5B illustrates the corresponding V groove 320 in the silicon substrate 110 formed from the anistropic etching by using the mask 500. The opening of the groove pattern 500 is designed to gradually widen from the center to both sides along the groove to be formed. Accordingly, the width and depth of the underlying V groove 320 also increase from the center portion 510 to side portions 520 that are spaced from the center along the groove 320. As illustrated, the surfaces of the V groove 320 are not flat but are curved as a result of etching through the above mask 500. FIGS. 5C, 5D, and 5E show the placement of fibers 140 in the above V-groove structure.

The above anistropic etching may be used to form both the V groove 320 and the openings 131 and 132 at both sides of the V groove 320 as shown in FIG. 1. Referring to FIG. 6, when opening of the groove pattern 500 in the etching mask 410 is sufficiently wide, side portions 620 of the V groove 610 can extend all the way through the substrate 110 from the surface 112 to the opposite surface 114 and hence create an opening 620 on the surface 114. The openings 620, therefore, can be used as the openings 131 and 132 to allow the fiber 140 to go through the substrate 110 from the surface 112 to the opposite surface 114.

Figure 7A:
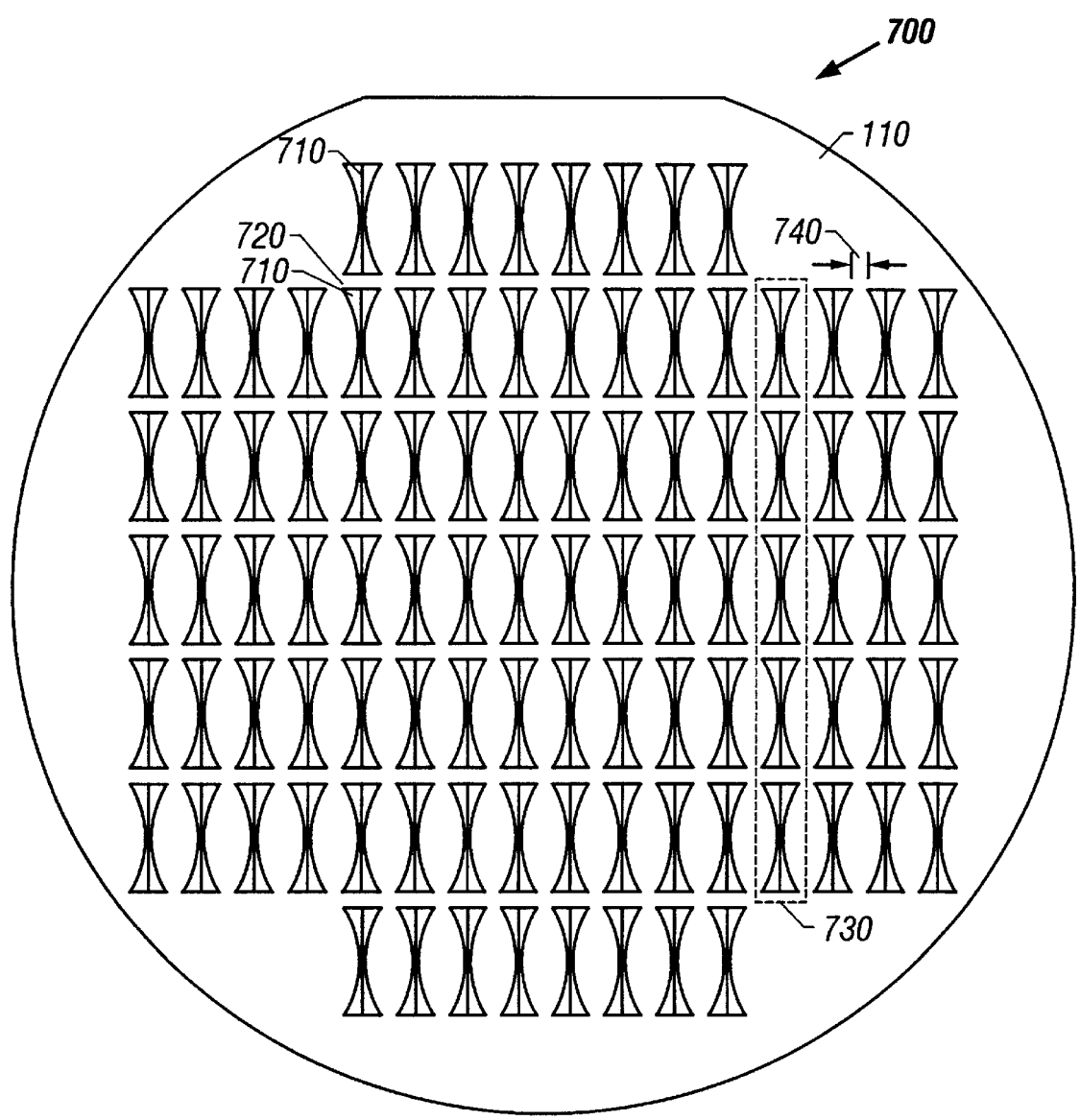
FIG. 7A shows a substrate that is fabricated with an array of grooves with openings.
Figure 7B:
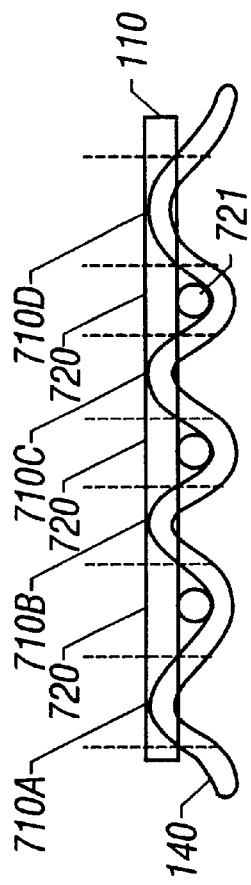
FIG. 7B shows a fiber device formed on a substrate with two or more grooves aligned with each other along a straight line on a single side of the substrate.

FIGS. 7A and 7B show that an array 700 of such V grooves 710 with two openings can be formed on one side of the substrate 110. The V grooves 710 may be aligned to be parallel to one another along their elongated directions and are arranged to form multiple parallel columns 730 with a spacing 740. Within each column 730, multiple V grooves 710 may be spaced from one another by a spacing 720. The substrate 110 with the array 700 may diced into multiple units each having one or more V grooves 710. Such units can be used to form various fiber devices. Hence, a batch fabrication process may be used to process the substrate 110 and to simultaneously form multiple fiber devices with V grooves 710.

A single fiber can be threaded through different V grooves 710 in a column 730 between the surfaces 112 and 114 via the openings 131 and 132. FIG. 7B shows an example where the fiber 140 is threaded through V grooves 710A, 710B, 710C, and 710D formed along a straight line on the surface 112 of the substrate 110. A spacer 721, such as a rod, may be optionally positioned on the surface 114 between the openings of two adjacent V grooves to provide a support to the fiber 140. Such support may be used to reduce sharp bending of the fiber 140 which may damage the fiber 140. After bonding and polishing the fiber 140, a coupling port is formed at each V groove on the surface 112 and is operable to couple optical energy out of or into the fiber 140. Therefore, this device has multiple coupling ports on the surface 112 to couple optical energy into or out of the fiber 140. When a proper control mechanism is implemented at each coupling port, optical switching, optical multiplexing, and other coupling operations may be achieved.

Figure 7C:
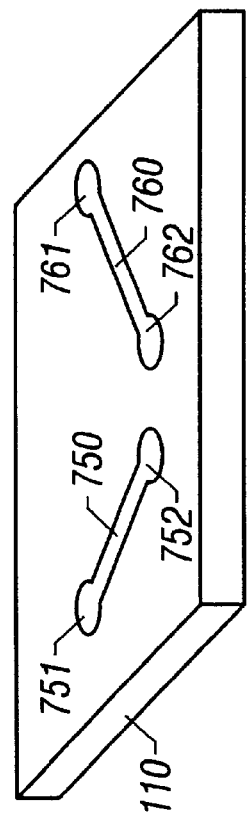
FIGS. 7C and 7D show fiber devices formed on a substrate with grooves on a single side of substrate that are oriented in different relative directions.
Figure 7D:
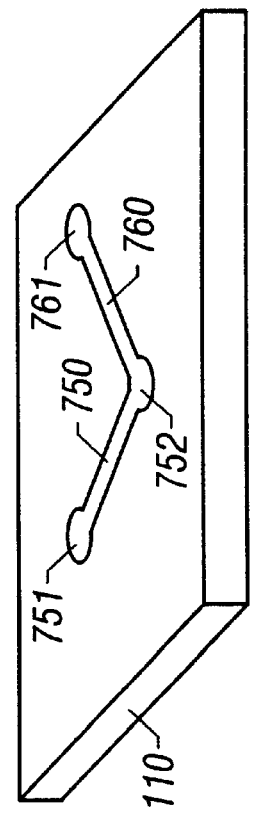

FIGS. 7C and 7D show additional embodiments of fiber devices that two different grooves 750 and 760 on the substrate 110 are not aligned along a straight line as in FIGS. 7A and 7B but form an angle with respect to each other. Numerals 751, 752, 761, and 762 indicate the openings of the grooves 750 and 760 that penetrate through the substrate 110. In FIG. 7C, the two grooves 750 and 760 are spaced from each other. A fiber may be placed in the grooves 750 and 760 by sequentially passing the fiber through the openings 761, 762, 752, and 751. In FIG. 7D, two grooves 750 and 760 are share a common opening 752. Such arrangements may be combined with aligned grooves.

Referring back to FIG. 1, the groove 120 with its two openings 131 and 132 may be formed on both sides 112 and 114 of the substrate 110 in the following manner. First, two adjacent grooves respectively formed in different sides of the substrate are aligned along the same groove direction. Second, the groove on one side shares an opening with the adjacent groove on the opposite side of the substrate 110. Techniques such as the double-sided photolithography may be used to form the V grooves on both surfaces of the substrate. Unlike the fiber device shown in FIG. 7B where the coupling ports are only on a single side of the substrate, a substrate with V grooves on both sides can form a fiber device with coupling ports on both sides of the substrate. Such double-sided coupling capability can provide flexible and versatile coupling configurations in various fiber devices.

Figure 8A:
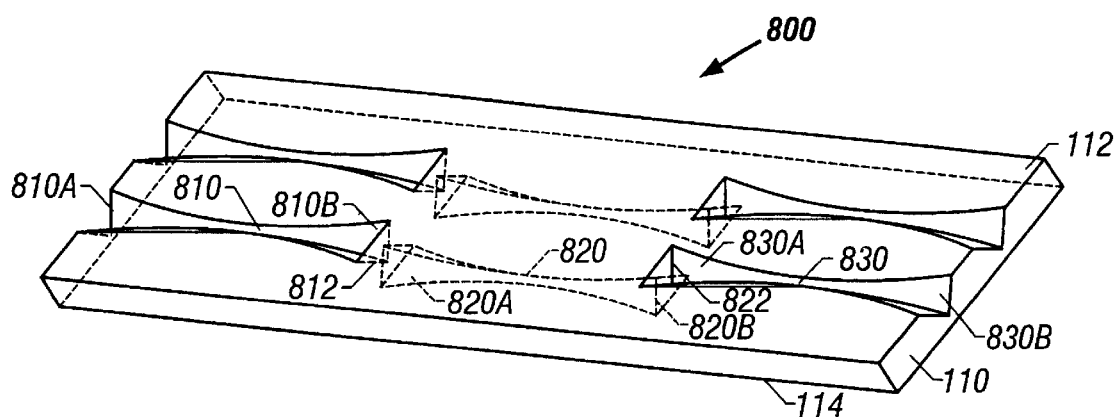
FIGS. 8A, 8B, 8C, 8D, and 9 illustrate substrates that are processed with grooves on both substrate surfaces.
Figure 8B:
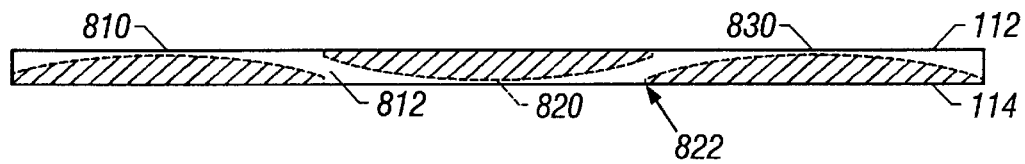
Figure 8C:

FIGS. 8A, 8B, and 8C illustrate one example of a fiber device 800 that has V grooves on both sides 112 and 114 of the substrate 110. A first V groove 820 is formed on the side 114. Similar to the V grooves in FIGS. 5B and 6, the depth and width of the V groove 820 increase from its center towards both ends 820A and 820B. A second, similar V groove 810 is formed on the opposite side 112 along the same groove direction. The end 810A of the second groove 810 overlaps with the end 820A of the first V groove 820 to create a through hole 812 that connects the V grooves 810 and 820. A third V groove 830 is also shown on the side 112 to have one end 830A overlap with the end 820B of the V groove 820 on the opposite side 114. A through hole 822 is then formed at the overlapping region to connect the V groove 820 to the V groove 830. A fiber 140 is shown in FIG. 8C to thread through the holes 812 and 822 to form coupling ports on both sides 112 and 114 of the substrate 110.

Figure 8D:
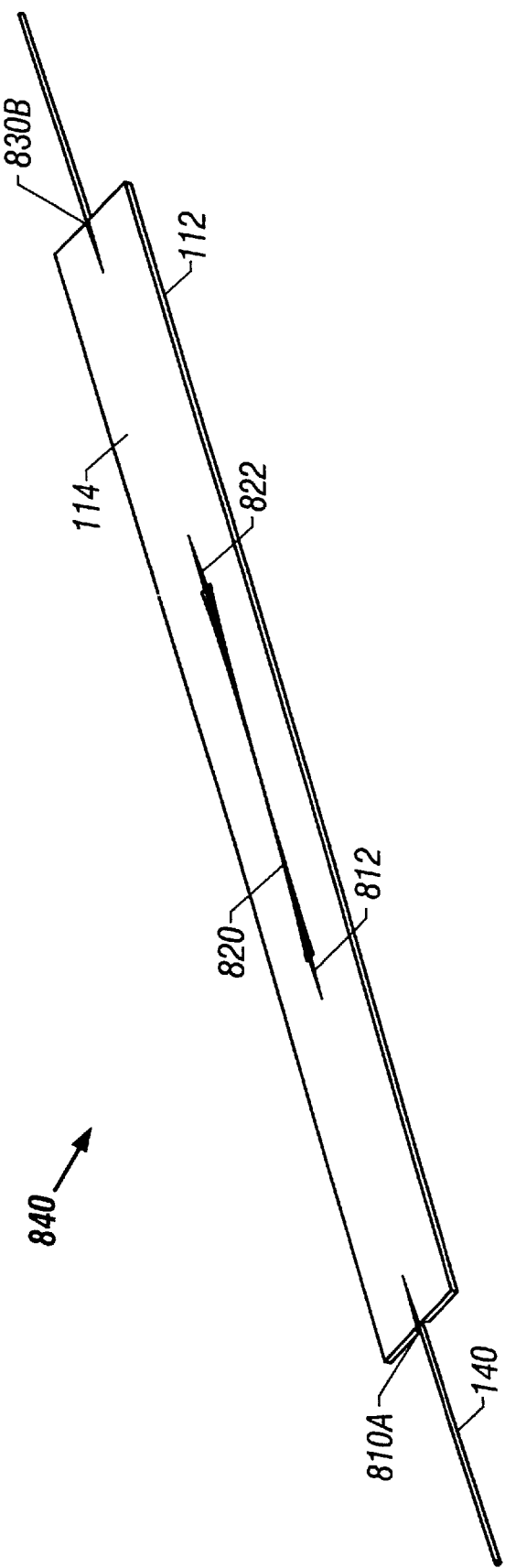
Figure 9:
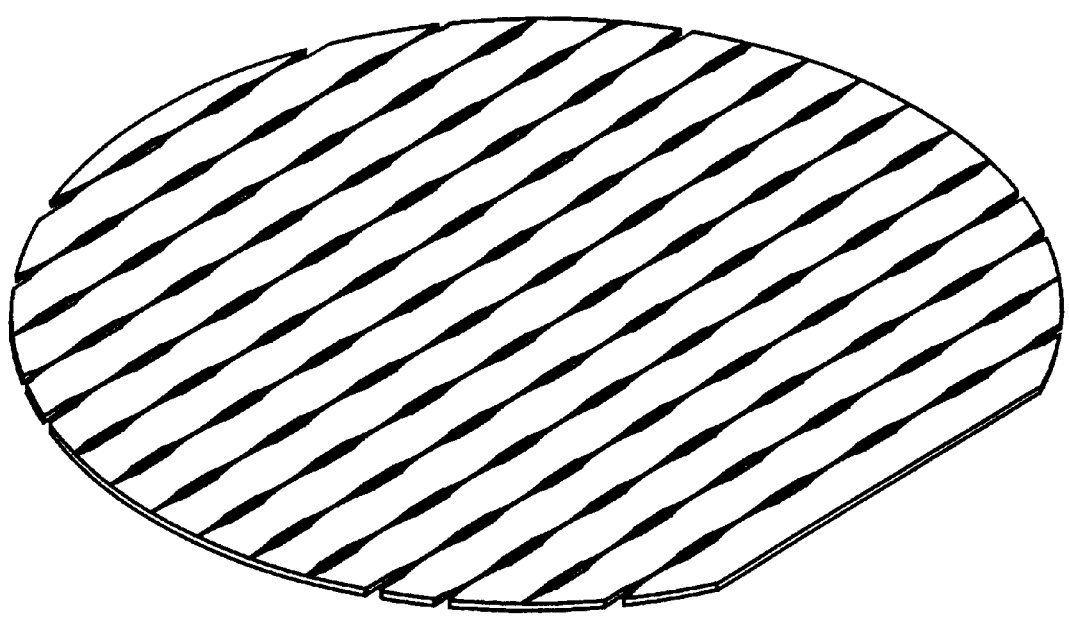

FIG. 8D shows a 3-port fiber device 840 that is formed by dicing a linear array of V grooves 810, 820, and 830 from the substrate 110. Comparing to the single-side device shown in FIG. 7B, the natural curvature of the V grooves formed on both sides eliminates the spacers 740. Similar to the batch fabrication of the single-sided devices shown in FIG. 7A, multiple double-sided devices may also be simultaneously fabricated from a single substrate as illustrated in FIG. 9.

In the above devices with V grooves formed on both sides of the substrate, two adjacent V grooves, located on opposite sides of the substrate, may not be aligned along a straight line but form an angle with each other as illustrated by the adjacent grooves formed on the same side shown in FIGS. 7C and 7D. Similar to the grooves in FIGS. 7A and 7B, two adjacent V grooves, located on opposite sides of the substrate, may also be designed to spatially separate from each other without sharing a common opening that penetrates through the substrate and extends between two sides of the substrate.

The openings in the above examples of V grooves are formed by anistropically etching for forming the V grooves. Hence, there is no need to use a separate process to fabricate the openings if the etching mask is properly designed. However, a separate fabrication step may also be used to form an opening and to achieve any desired geometric shape of the opening that may be difficult or impossible to make through etching the V grooves.

Figure 10:
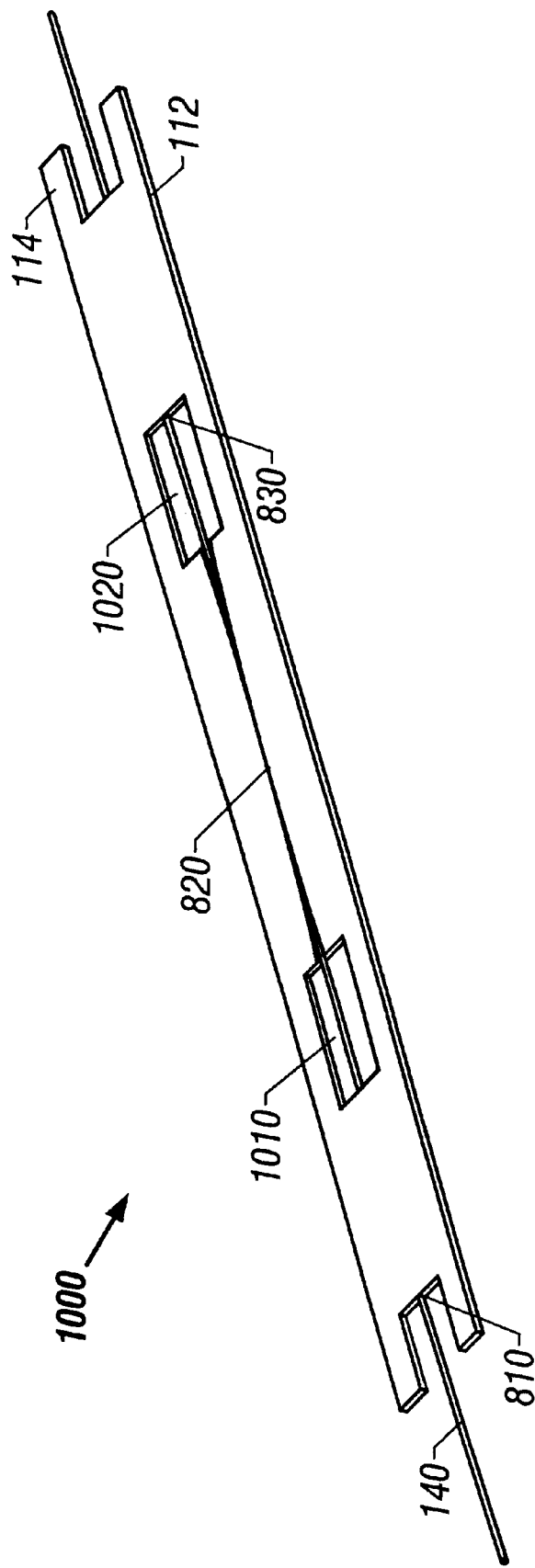
FIG. 10 shows a substrate processed with grooves on both substrate surfaces, where openings at both ends of each groove are separately fabricated from the V grooves.

FIG. 10 illustrates a fiber device 1000 with aligned V grooves 810, 820, and 830 on both sides 112 and 114 of the substrate 110 that are spaced from one another by rectangular openings 1010 and 1020. V grooves 810 and 830 are formed on the side 114 and the groove 820 is formed on the opposite surface 112 but is located between the grooves 810 and 830. An etching process separate from etching of the V grooves is needed to form such openings 1010 and 1020. Other processing techniques such as laser machining may also be used to form the openings.

The above fiber devices with V grooves either on one side or two sides may be used to form various fiber devices. Some exemplary devices are described below.

Figure 11:
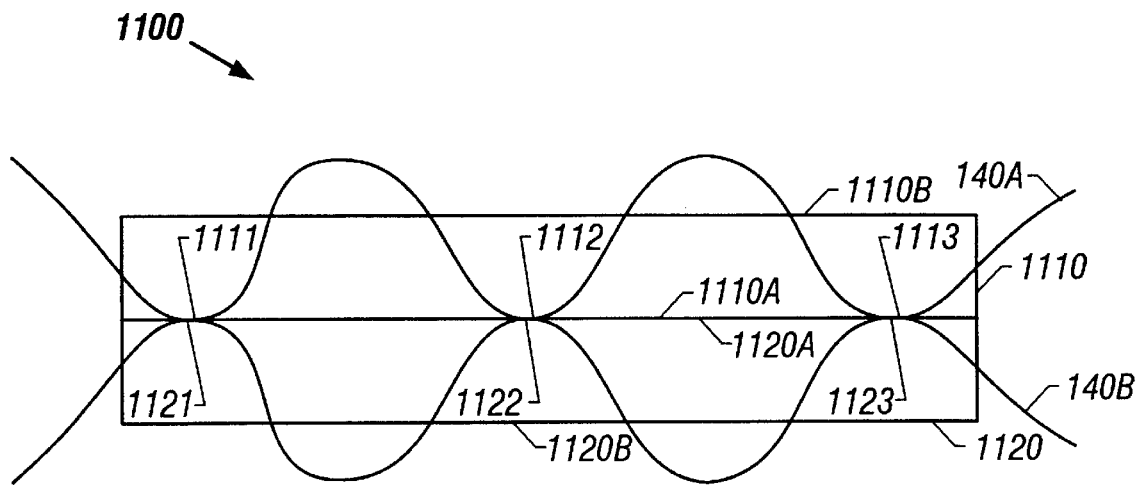
FIGS. 11 and 12 show exemplary fiber devices by integrating fibers to substrates with grooves.

FIG. 11 shows an optical fiber coupler 1100 by using two substrates 1110 and 1120 each with V grooves on a single surface of the substrate. The substrate 1110 has a surface 1110A on which three V grooves are fabricated and a fiber 140A is placed therein to form three coupling ports 1111, 1112, and 1113. Similarly, the substrate 1120 has a surface 1120A on which three V grooves are fabricated and a fiber 140B is placed therein to form three coupling ports 1121, 1122, and 1123. The two substrates 1110 and 1120 are engaged by having the surfaces 1110A and 1120A to face each other. The ports on one substrate substantially overlap with the coupling ports of another substrate to allow energy exchange between the fibers 140A and 140B. Various techniques may be used to engage the two substrates together, such as optical epoxy, glass frit thermal bond, CO2 laser assisted thermal bond.

A fiber device with V grooves on both sides of the substrate can be used to provide coupling on both sides. More coupling flexibility can be achieved in such a device than a device with grooves on only one side. For example, each fiber in the device 1100 shown in FIG. 11 cannot be accessed from the exposed surfaces 1110B and 1120B. Such access would be possible if one of the two substrates 1110 and 1120 were designed to have grooves on both sides. Thus, three or more substrates may be vertically stacked together to form a multi-layer optical coupler. Since each substrate may have two or more fibers, coupling among many fibers in different substrates may be achieved.

Figure 12:
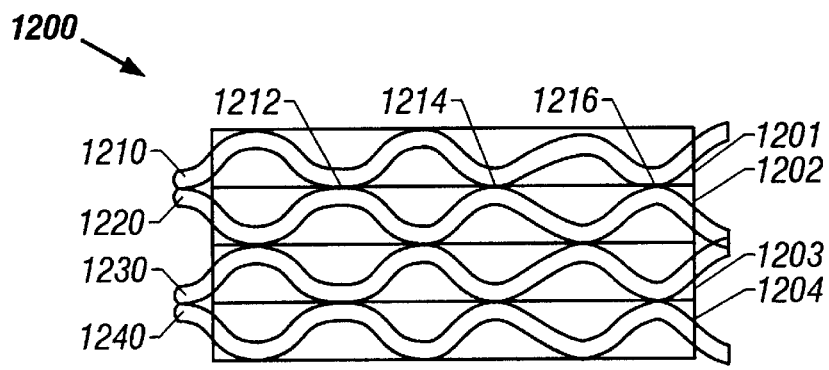

FIG. 12 shows a 4-layer optical multi-port coupler 1200 having 4 different double-sided substrates 1201, 1202, 1203, and 1204 based on the designs shown in FIG. 8D or 10. Four different fibers 1210, 1220, 1230, and 1240 are respectively threaded in the substrates 1201, 1202, 1203, and 1204. Two adjacent substrates, such as 1201 and 1202, may be coupled to form the coupling ports 1212, 1214, and 1216. Hence, optical energy can be coupled between any two fibers. For example, an optical signal in the fiber 1210 may be coupled to the fiber 1230 by first coupling into the fiber 1220 and then coupling from the fiber 1220 into the fiber 1230. In general, a double-sided substrate can interface at both sides with other single-sided or double-sided substrates.

Figure 13A:
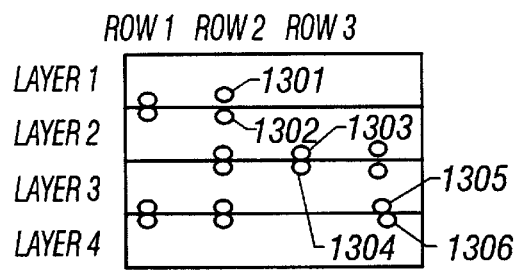
FIG. 13A shows uses of relative positions between grooves to control optical coupling between fibers positioned in the grooves.

FIG. 13A illustrates that optical coupling between two fibers in different layers may be controlled in a number of ways by controlling the relative position of the two fibers in grooves. For example, no optical coupling occurs between fibers 1301 and 1302 in the layers 1201 and 1202 when they are placed in deep grooves to have a separation much greater than one wavelength of the light. The fibers 1303 and 1304 in the layers 1202 and 1203 are positioned in shallow grooves so that a portion of each fiber's cladding is removed to allow for optical coupling. The depth of the grooves for the fibers 1303 and 1304 can be controlled to control the coupling strength via evanescent fields. The fibers 1305 and 1306, also in shallow grooves, are spatially offset in the lateral direction so that the optical coupling is reduced with the amount of the offset.

The grooves for holding fibers 1301 and 1302 are "deep" grooves in that the depth of the groove is greater than the diameter of the fiber so that the fiber cladding in the fiber portion in such grooves is not exposed above the substrate surface and no optical coupling port is formed. The grooves for holding the fibers 1303, 1304, 1305, and 1306, on the other hand, are "shallow" grooves as the groove 120 described with reference to FIG. 1 where a portion of a part of the fiber cladding protrudes above the substrate surface when the fiber is placed in such a groove and can be removed to form an optical coupling port 144. Such deep and shallow grooves may be combined to provide flexibility and versatility in routing fibers and arranging optical coupling ports in a fiber device.

Figure 13B:
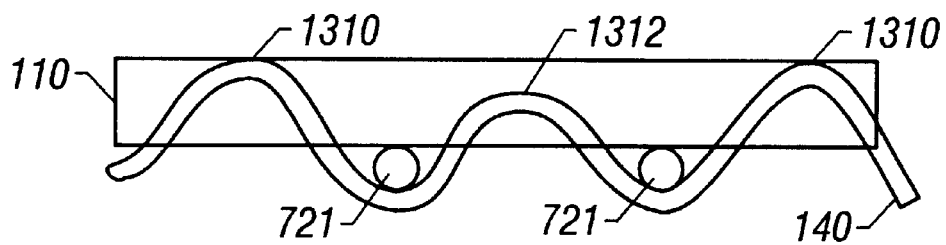
FIG. 13B shows a substrate with both deep and shallow grooves formed on a single side.
Figure 13C:
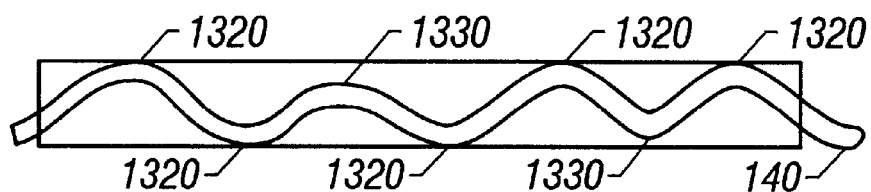
FIG. 13C shows a substrate with both deep and shallow grooves formed on both sides.

FIG. 13B shows a single-sided substrate similar to the substrate in FIG. 7B but processed to have both deep grooves 1312 and shallow grooves 1310. Each deep grove 1312 is used at a location where optical coupling is undesirable. FIG. 13C shows a double-sided substrate with deep grooves 1330 and shallow grooves 1320.

Figure 14:
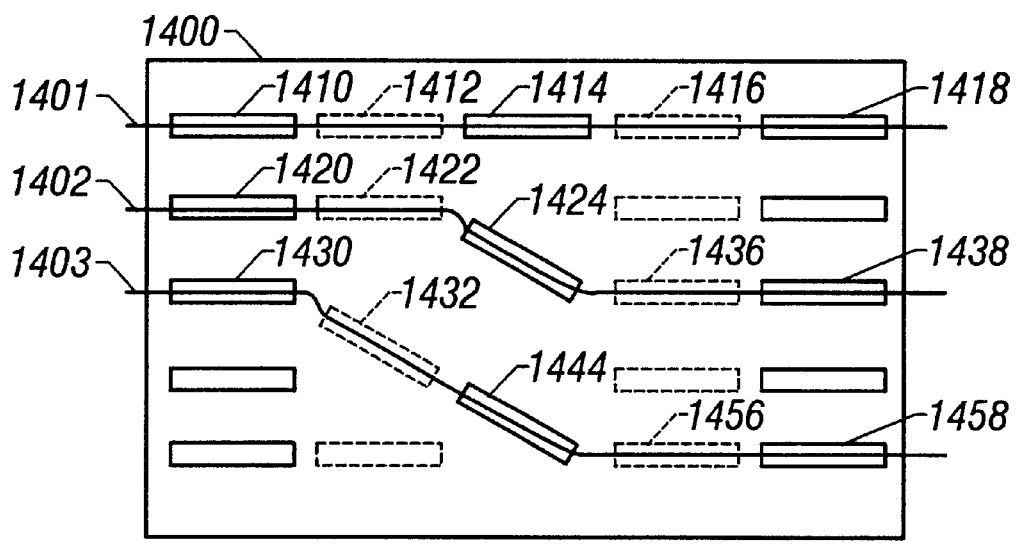
FIG. 14 shows an exemplary fiber device that has lateral jump-channel grooves on the substrate to change a direction of a fiber in the substrate plane.

FIG. 14 further shows that a lateral jump-channel groove 1424 on a substrate 1400 may be used to change the lateral direction of a fiber. The substrate 1400 is shown to have grooves on both sides. Solid elongated boxes such as 1410 represent grooves formed on one side and the dashed elongated boxes such as 1412 represent grooves formed on the other side. The grooves 1410, 1412, 1414, 1416, and 1418 are aligned with one another along a straight line to hold a fiber 1401. The groove 1424 is a lateral jump-channel groove that is oriented with an angle relative to adjacent grooves 1422 and 1436. Hence, a fiber 1402 can be threaded through the lateral jump-channel groove 1424 to run through grooves 1440 and 1422 and then to change its direction to run through grooves 1436 and 1438. Lateral jump-channel grooves 1432 and 1444 are also shown to direct the fiber 1402 from the groove 1430 to grooves 1456 and 1458. A single-side substrate with grooves on one side may also be designed to have such lateral jump-channel grooves.

Such a lateral jump-channel can be combined with the vertical integration of different double-side substrates to change the direction of an optical signal both laterally within a substrate and vertically from one substrate to another substrate. This opens up possibility similar to multi-layer printed circuit board technology allowing sophisticated connections from point to point and from layer to layer.

Figure 15:
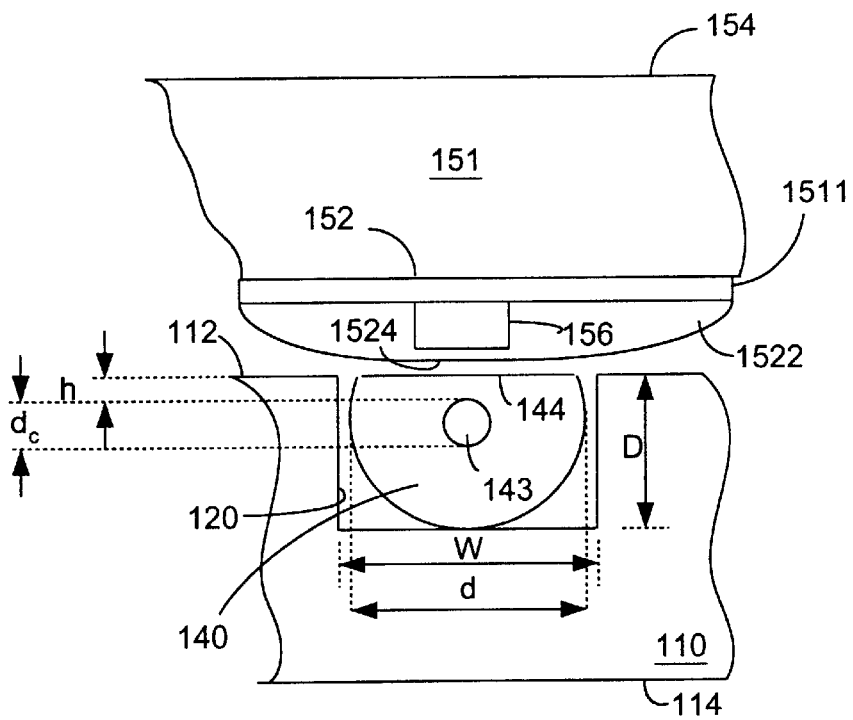

FIG. 15 shows a waveguide 156 in a ridge configuration where the waveguide 156 is sandwiched between two lower index cladding layers 1511 and 1522 formed over the surface 152 of the substrate 151. A portion of the top cladding layer 1522 is removed to form an optical waveguide coupling port 1524 to interface with the fiber coupling port 144. The spacing between the fiber core 143 and the waveguide 156 is in an order of magnitude of or less than one wavelength of the optical energy to be coupled to allow for evanescent coupling.

Figure 16:
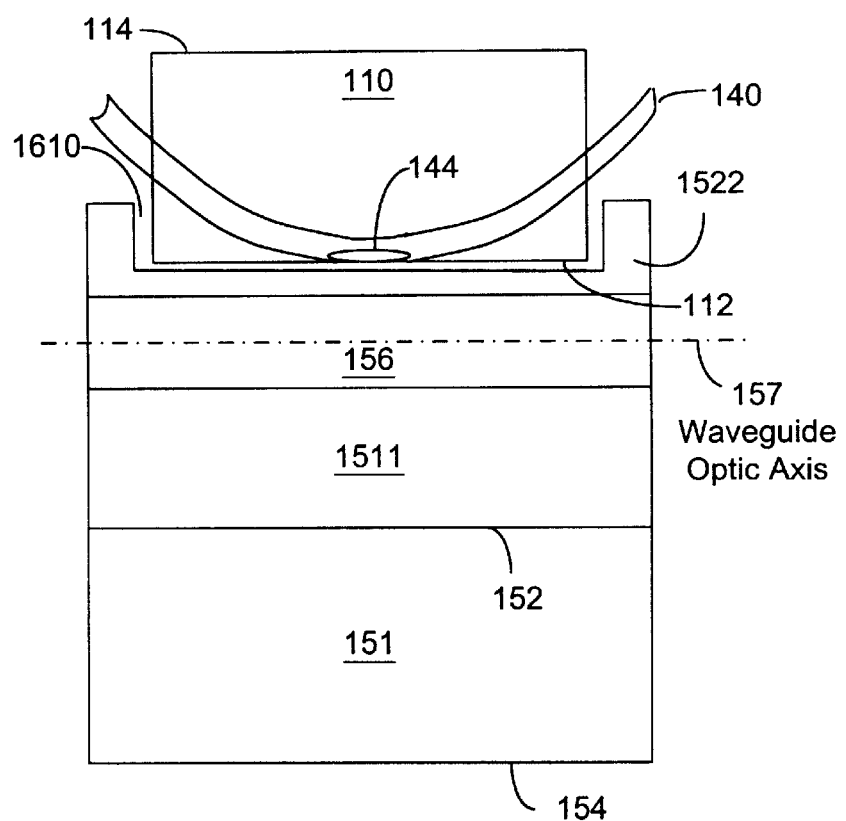

FIG. 16 shows a waveguide 156 in a slab configuration where the waveguide 156 is sandwiched between two lower index cladding layers 1511 and 1522, both of which are formed over the surface 152 of the substrate 151. As illustrated, a guided optical signal in this slab waveguide 156 is confined to propagate along the waveguide optic axis 157. An opening 1610 is fabricated in the top cladding layer 1522 so that the fiber device 100 may be at least partially positioned within the opening 1610 to place the fiber coupling port 144 close to the waveguide 156 for evanescent coupling. Referring back to FIGS. 1 and 2B, the elongated groove 120 for holing the fiber 140 is substantially parallel to the waveguide optic axis 157. The fiber coupling port 144 may be in direct contact with the bottom surface of the opening 1610 in the top cladding layer 1522. Alternatively, a thin layer of special bonding materials, e.g. epoxy, may be formed between the surface 112 and the bottom surface of the opening 1610 in the top cladding layer 1522.

The fiber module 100 may be either in a single-sided configuration where grooves and fiber ports for a single fiber are formed on only one side of the substrate 110 or in a double-sided configuration where grooves and fiber ports of a single fiber are formed on both sides of the substrate 110. The double-side fiber module 100 may be used to couple two different waveguide modules 150. FIG. 17 further shows a fiber 140 integrated or engaged in a double-sided substrate 1700 with shallow grooves on both sides so that the fiber 140 has fiber coupling ports 1710 and 1720 on the opposite sides of the substrate. In this configuration, two waveguide modules 150A and 150B may be couple to both sides of the substrate 1700 so that the fiber 140 can be evanescently coupled to the waveguide 156A in the waveguide module 150A through the port 1710 and to the waveguide 156B in the waveguide module 150B through the port 1720. This vertical integration, when combined with the horizontal fiber-to-fiber jump channels and horizontal waveguide-to-waveguide coupling configurations, can be used to form versatile fiber-waveguide coupling schemes.

It is also contemplated that, a diffraction grating may be formed in the interface between the fiber 140 and the waveguide 156 to assist or facilitate the optical coupling. The grating has a periodic grating pattern along the fiber 140 or the waveguide 156. This grating-assisted coupling may be desirable to obtain a high efficiency in the optical coupling. This is in part because it may be difficult to match a guided optical mode in the waveguide 156 to a guided optical mode in the fiber 140 due to factors such as the differences in the refractive indices, the cross section geometries of the waveguide 156 and the fiber core in the fiber 140, and the cladding structures.

Figure 18A:
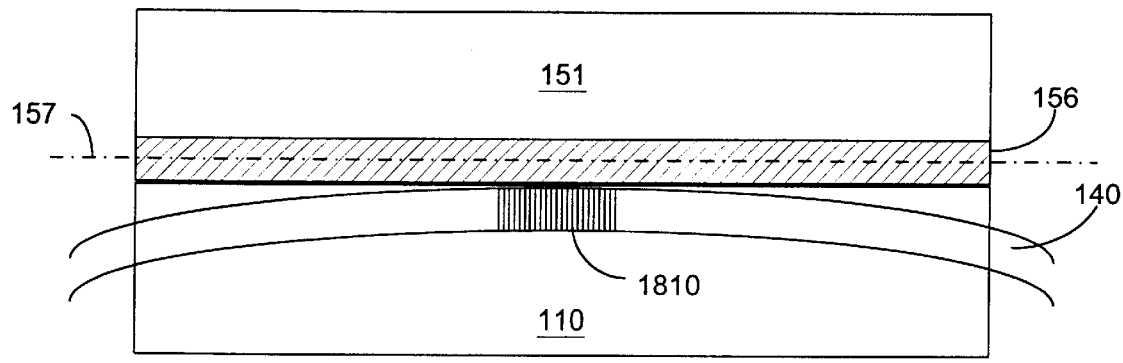
FIGS. 18A, 18B, and 18C show fiber-waveguide couplers with a diffraction grating to assist the optical coupling.
Figure 18B:
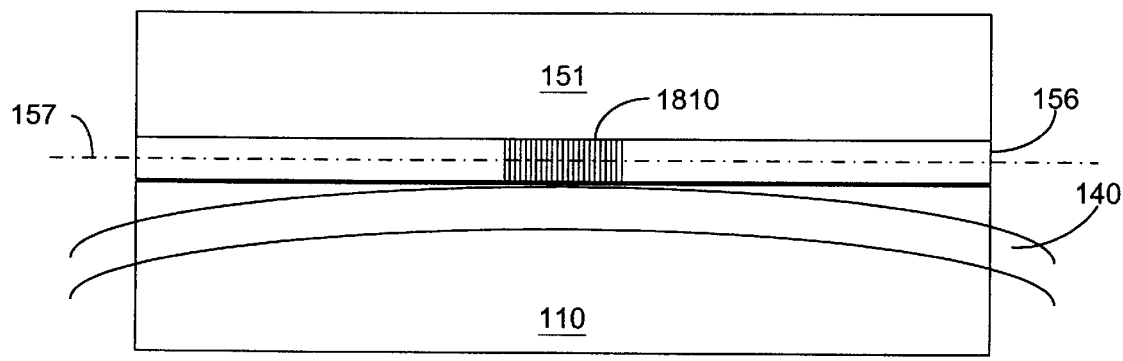
Figure 18C:
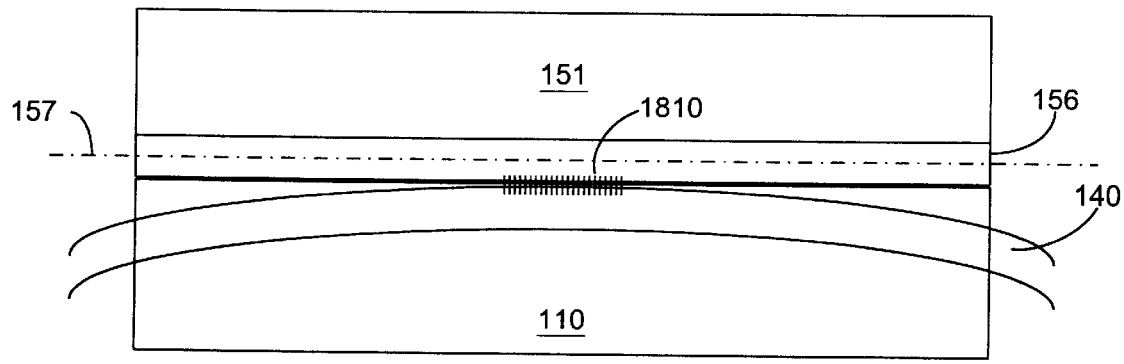

FIGS. 18A, 18B, and 18C show three embodiments of fiber-waveguide couplers where a diffraction grating 1810 is implemented to assist the optical coupling. In FIG. 18A, the grating 1810 is formed in the fiber 140. This may be achieved by fabricating the grating pattern in the fiber core or in the fiber cladding. In FIG. 18B, The grating 1810 is formed in the waveguide 156. In FIG. 18C, the grating 1810 is formed between the waveguide 156 and the fiber 140 by, e.g., forming the grating pattern in a thin overlay layer between the waveguide 156 and the fiber 140. Such a diffraction grating may be fabricated by, e.g., etching, modifying the refractive index of the waveguide or fiber by UV exposure, or other processes. When the waveguide 156 or the cladding of the fiber 140 is etched to form a grating pattern, a different dielectric material, such as a liquid crystal material, may be filled and sealed in the grating area to form the final grating 1810.

The grating 1810 may also be a tunable grating which changes its diffracting characteristics in response to an external control signal. An electro-optic or a thermal optic material may be used to form the grating 1801 so that an external electrical signal may be used to control and tune the grating. This tuning may be used to select a particular wavelength or light with a particular polarization to be coupled while other optical signals remain in either the waveguide 156 or the fiber 140.

The above fiber-waveguide couplers, with or without the diffraction grating, may be used in optical devices where optical coupling between a fiber and a waveguide is needed. Examples of such devices may include, among others, optical couplers, optical attenuators, optical modulators, optical beam splitters, optical switches, and frequency-division multiplexers and demultiplexer, optical amplifiers and lasers. For example, the waveguide 156 may be formed by an optical gain medium such as semiconductor layers (e.g., multiple quantum-well structures) to produce optical gain for producing a laser beam as in a semiconductor-based laser or amplifying an input optical beam as in a semiconductor optical amplifier.

FIGS. 19A and 19B show two semiconductor amplifiers that use input and output fibers 140A and 140B to respectively couple input light into and amplified output light out of a waveguide 156 that has a gain section 1900. The grain section 1900 may include MQW layers and electrodes coupled to a power supply. The configuration in FIG. 19A uses fibers 140A and 140B that are integrated or engaged onto two separate substrates 110A and 110B, respectively, based on the above integration techniques. A single substrate 110A is used in FIG. 19B to hold both fibers 140A and 140B. The fiber 140A is configured and positioned to form an input fiber-waveguide coupler 1910 at one end of the section 1900 to receive input light to be amplified from one side of the fiber 140A. The fiber 140B is configured and positioned to form an output fiber-waveguide coupler 1920 at another end of section 1900 to export amplified output light to one side of the fiber 140B. This input and output mechanism avoids the generally-problematic end-to-end interconnection between the fiber and waveguide. Problems associated with optical reflection at the end facets of the waveguide 156 can also be addressed since most of the amplified light, if not all, is coupled out of the waveguide 156 at the position of the output coupler 1920 without reaching the end facet of the waveguide 156. An optical absorbing element may be used at the end of the waveguide 156 to absorb any residual light passing through the output coupler 1920.

Figure 20:
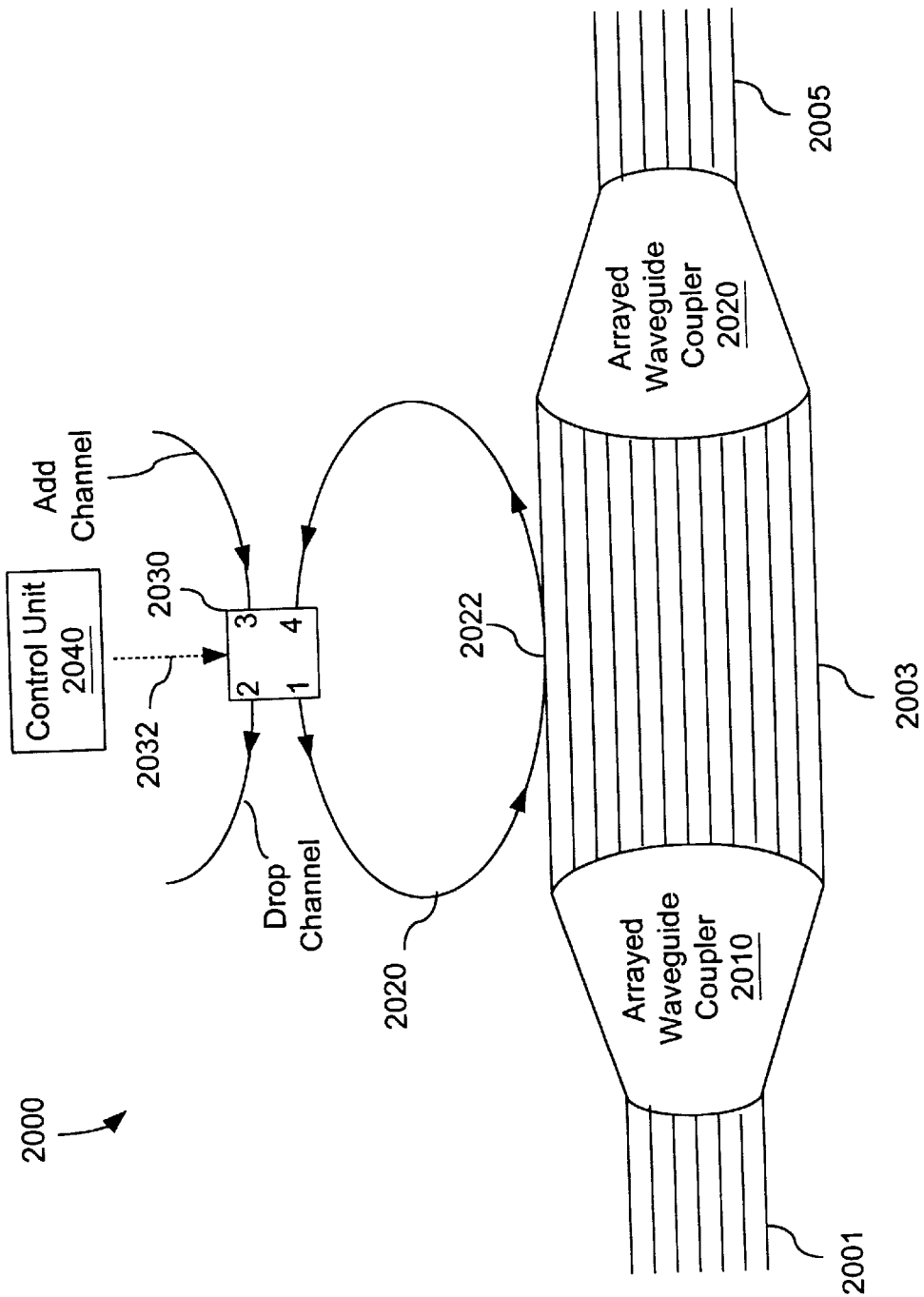
FIG. 20 shows an AWG WDM multiplexer/demultiplxer based on two arrayed waveguide couplers formed on a waveguide substrate coupled to one or more side-polished fiber coupling ports formed in another substrate for add/drop operations.

FIG. 20 shows an arrayed waveguide grating (AWG) 2000 with an add/drop mechanism based on the above waveguide-fiber coupling. The AWG 2000 includes input waveguides 2001, input arrayed waveguide coupler 2010, arrayed waveguides 2003, output arrayed waveguide coupler 2020, and output waveguides 2005, all formed over a single waveguide substrate. The arrayed waveguides 203 generally have different optical path lengths to produce desired relative phase shifts at the output coupler 2010. The AWG 2000 may be used to perform a number of functions, including WDM demultiplexing in which different WDM channels received by an input waveguide 2001 are separated and output in different output waveguides 2005, and WDM multiplexing in which different WDM channels received from different input waveguides 2001 are combined into a selected, single output waveguide 2005. The above fiber-waveguide coupling may be used to add a WDM channel to or drop a WDM channel from one or more selected arrayed waveguides between the two couplers 2010 and 2020.

More specifically, a second substrate is used to hold one or more fibers with side-polished fiber coupling ports for evanescent coupling. The second substrate is placed near the waveguide substrate in the manner similar to what is shown in FIG. 1 to couple the fiber coupling port 2022 of a respective fiber 2020 to a respective arrayed waveguide 2003. The fiber-waveguide coupling is designed to that an optical signal carried by the arrayed waveguide 2003 (or the fiber 2020) and approaching the coupling region will be completely coupled into the fiber 2020 (or the waveguide 2003). An optical switch 2030, with at least two input ports 3, 4 and two output ports 1, 2, is coupled to two terminals of the fiber 2020 at its ports 1 and 4. The input port 3 is coupled to receive an add WDM channel and the output port 2 is used to export a drop WDM channel. A switch control 2040 is coupled to the switch 2030 by using a control signal 2032 to control the switch 2030.

In operation, when no channel is added or dropped, the control 2040 sets the switch 2030 to direct the received signal at the input port 4 to the output port 1. In this switching state, a WDM channel in the arrayed waveguide 2003 is first coupled into the fiber 2020 through the fiber coupling port 2022 and then is directed back to the coupling port 2022 by the switch 2030 and the fiber 2020. As a result, this WDM channel is coupled back to the arrayed waveguide to reach the output coupler 2020 and a designated output waveguide 2005. On the other hand, when a WDM channel is to be dropped or added, the switch control 2040 sets the switch 2030 to direct the received signal at the input port 4 to the output port 2 and the received signal at the input port 3 to the output port 1. This drops out a WDM channel from the arrayed waveguide 2003 and adds a new WDM channel to the arrayed waveguide 2003 if any.

In one implementation, the second substrate may have the same number of side-polished fibers arranged with respect to each other in the same pattern as one portion of the arrayed waveguides 2003. Each fiber is coupled to a switch 2030 for adding or dropping a channel. This configuration allows adding or dropping selected one or more channels in any of the arrayed waveguides between the couplers 2010 and 2020. The switch control 2040 hence can be coupled to control all switches 2030 to allow a programmable or dynamic add/drop operation of the AWG 2000.

Figure 21:
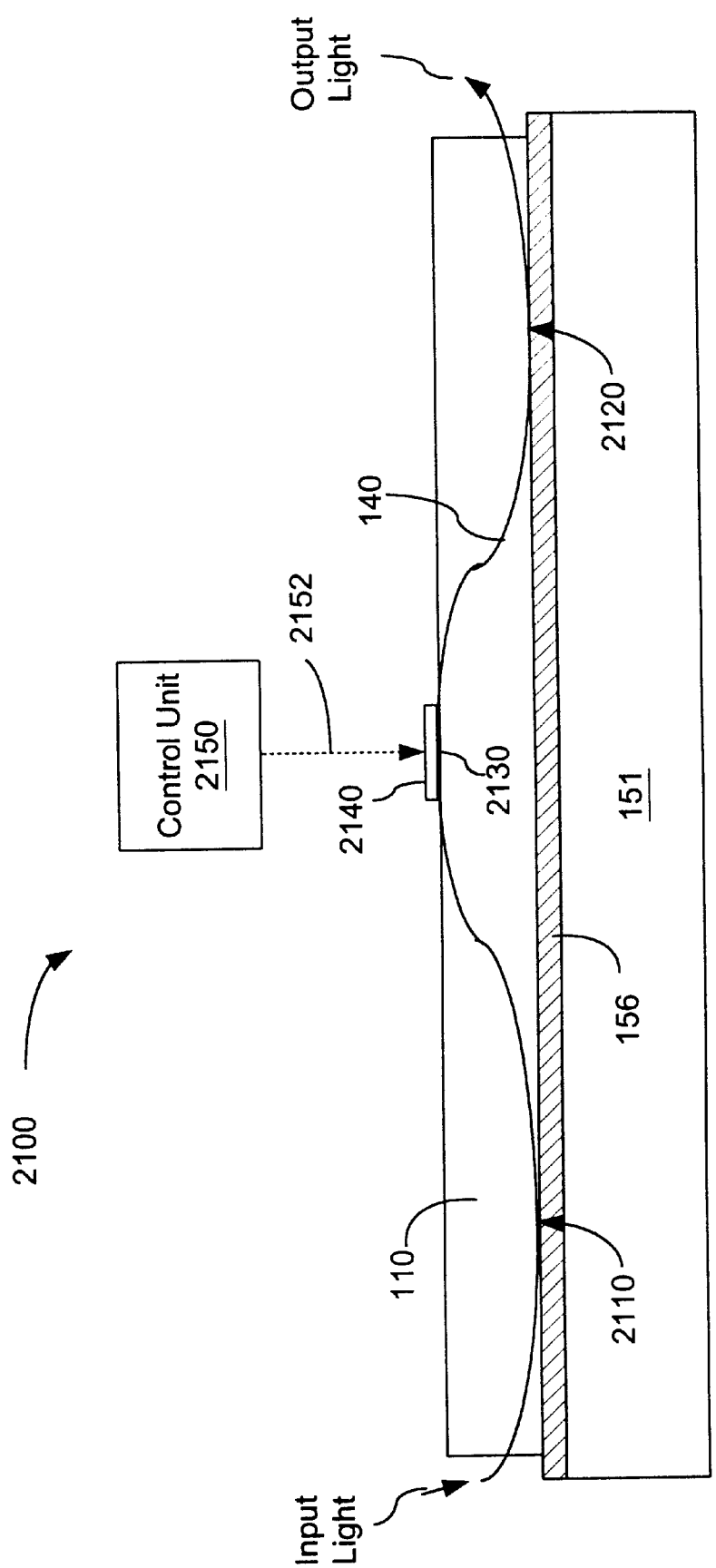
FIG. 21 shows an adjustable device based on a fiber-waveguide coupler according to one embodiment.

In yet another application, the above fiber-waveguide coupling scheme may be used to construct an adjustable optical device 2100 as illustrated in FIG. 21. The fiber 140 is engaged to the substrate 110 to have three fiber coupling ports 2110, 2120, and 2130. The fiber coupling ports 2110 and 2120 are formed over the same substrate surface. The fiber coupling port 2130, located in the fiber 140 between the ports 2110 and 2120, however, is formed on the opposite substrate surface. The substrates 110 and 151 are positioned to couple the waveguide 156 on the substrate 151 to the fiber 140 at two different locations through the fiber coupling ports 2110 and 2120. The third fiber coupling port 2130, not in direct coupling with the waveguide 156, is configured to change a property of the light traveling through the port 2130 in an adjustable manner under a control by an external control signal 2152. A control unit 2150 is used to generate the control signal 2152. FIG. 21 shows a double-sided fiber module in which the fiber 140 is engaged as illustrated in FIG. 8C. In general, the fiber coupling port 2130 may be located anywhere so long as it is in the fiber 140 between the two coupling ports 2110 and 2120.

A transducer 2140 is formed at the fiber coupling port 2130 to effectuate the change of the light property in response to the control signal 2152. The transducer 2140 may be an optical diffractive grating formed in a thin layer formed over the polished cladding surface, in the fiber cladding, or in the fiber core of the fiber 140. This grating can interact with the evanescent field of the guided light in the fiber 140 and diffracts light out of the fiber 140 to reduce the intensity of the remaining guided light. The grating strength, for example, may be adjustable in response to the control signal 2152. Such a grating may be formed by etched grating features filled with an index-adjustable material such as a thermal-optic material whose index changes with temperature, an electro-optic material whose index changes with applied electric field (e.g., a liquid crystal material), or a photo-sensitive material whose index changes with an optical control beam.

In another implementation, the transducer 2140 may also be designed to change the phase of the guided light in the fiber 140 without the diffractive grating structure. The fiber segment in the fiber coupling port 2130 may be designed so that that segment's index is adjustable. A thermal-optic material, an electro-optic material, or a photo-sensitive material may be used. When a thermal-optic material is used, the transducer 2140 may be a local heating element. When an electro-optic material is used, the transducer 2140 may be an electrode element through which the control electric field is applied. When a photo-sensitive material is used, the transducer 2140 may be a light source with light guiding optics. In addition, the transducer 2140 may be designed to change both intensity and phase of the guide light in the fiber 140.

It is further contemplated that, a segment of the waveguide 156 located between the ports 2110 and 2120 may be an adjustable portion which can adjust the a property (e.g., phase, intensity, or both) of guided light in the waveguide 156 in response to a control signal. Such an adjustable portion may be implemented in both the fiber 140 and the waveguide 156 between the coupling ports 2110 and 2120 to control the output light in either the fiber 140 and the waveguide 156 after the second coupling port 2120.

Figure 22:
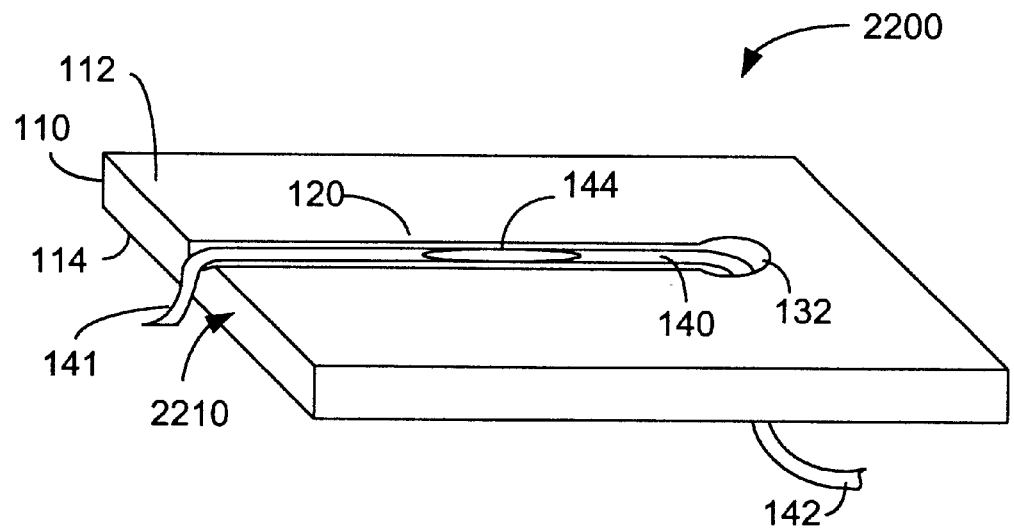
FIG. 22 shows a design to engage a side-polished fiber on to a substrate by using an elongated groove with a single through hole.
Figure 23:
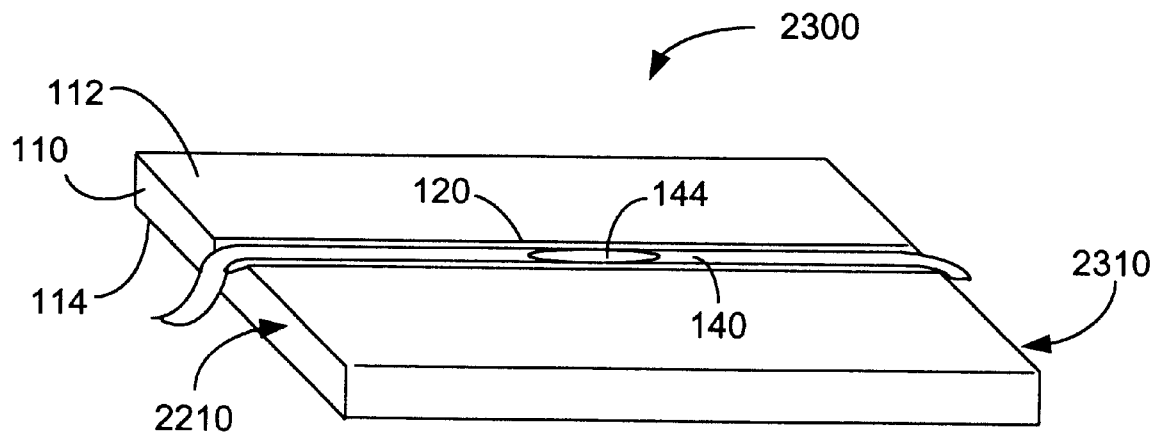
FIG. 23 shows another way of engaging a side-polished fiber onto a substrate without using through holes shown in FIG. 1.

FIGS. 1 and 2A show the use of elongated groove 120 and two through holes 131 and 132 at the ends of the groove 120 to engage a fiber to the substrate 110 and to form the fiber coupling port 144. Alternatively, only one through hole 132 in the substrate 110 may be needed to engage the fiber 140 to form the fiber module for coupling with a waveguide module. As shown in the design 2200 in FIG. 22, the groove 120 may extend to one end side 2210 of the substrate 110 so that one end 141 of the fiber 140 leaves the groove 120 without going through a through hole. In addition, FIG. 23 shows a conventional design 2300 in which the groove 120 may extend to two opposing end sides 2210 and 2310 of the substrate 110 so that the fiber 140 is engaged to the groove 120 without relying on any through holes. Each of these structures may be used to form engage the fiber 140 to the substrate 110 and to form the fiber-waveguide coupling device. In a device where multiple fiber-waveguide couplers are implemented, these different configurations may be used at different couplers in the same device.

In the above devices, at least one buffer layer of a suitable material such as a dielectric material like silicon dioxide or silicon nitride may be formed over a groove under the fiber. This buffer layer may be designed to have certain mechanical or thermal properties to stabilize the structure formed by the substrate, the buffer layer, and the fiber by reducing the mechanical or thermal stress between the silicon substrate and the glass fiber. Therefore the reliability of the device can be improved. For example, if the substrate is formed of silicon, a dielectric material with a coefficient of thermal expansion (CTE) between the CTE values of the silicon and the glass fiber may be used as the buffer. Two or more buffer layers may also be used to achieve desired stabilizing effects.

Although only a few embodiments are described, various modifications and enhancements may be made without departing from the following claims.

What is claimed is:

1. A device, comprising:
    a fiber module having a first substrate with a first surface fabricated to form an elongated groove with two through holes penetrating said first substrate and formed on both ends of said groove, and a fiber engaged to said first substrate by passing through both said through holes to have a portion laid in said elongated groove, wherein cladding of said portion is removed to form a fiber coupling port for evanescently coupling energy into and out of said fiber; and
    a waveguide module having a second substrate configured to have an optical waveguide with a waveguide portion to form a waveguide coupling port for evanescently coupling energy into and out of said waveguide,
    wherein said waveguide module is engaged to said fiber module to place said elongated groove substantially parallel to said waveguide and to interface said fiber coupling port with said waveguide coupling port for evanescent optical coupling between said waveguide and said fiber.

2. The device as in claim 1, wherein said second substrate has a second surface parallel to and facing said first surface of said first substrate, and wherein said waveguide is formed in said substrate and said waveguide portion is at the same plane of said second surface.

3. The device as in claim 1, wherein said second substrate has a second surface parallel to and facing said first surface of said first substrate and said waveguide is formed over said second surface on said substrate, and wherein said waveguide module further includes a first cladding layer formed between said second surface and said waveguide and a second cladding layer formed to cover said waveguide, and a portion of said second cladding layer is removed to form said waveguide coupling port.

4. The device as in claim 3, wherein said waveguide is a ridge waveguide.

5. The device as in claim 3, wherein said waveguide is a slab waveguide.

6. The device as in claim 3, wherein said waveguide is a channel waveguide.

7. The device as in claim 1, wherein said waveguide is further configured to include an optical grating formed in said waveguide portion to assist said evanescent optical coupling between said waveguide and said fiber.

8. The device as in claim 7, further comprising an optical grating formed in cladding of said fiber to assist said evanescent optical coupling between said waveguide and said fiber.

9. The device as in claim 7, further comprising an optical grating formed in a core of said fiber to assist said evanescent optical coupling between said waveguide and said fiber.

10. The device as in claim 1, further comprising an optical grating formed between said waveguide and said fiber to assist said evanescent optical coupling between said waveguide and said fiber.

11. The device as in claim 1, wherein said waveguide module further includes a second waveguide formed on said second substrate and engaged to said waveguide to receive at least a portion of an optical signal in said fiber through optical coupling with said waveguide.

12. The device as in claim 1, further comprising at least one buffer layer in said elongated groove between said first substrate and said fiber to reduce a mechanical or thermal stress.

13. A method, comprising:
    engaging a fiber to a first substrate by passing through two through holes formed in said first substrate to lay a portion of said fiber in an elongated groove formed between said through holes;
    removing a portion of cladding of said portion to form a fiber coupling port to allow for evanescent optical coupling into and out of said fiber;
    forming a waveguide coupling port in a waveguide formed on a second substrate to allow for evanescent optical coupling into and out of said waveguide; and
    positioning said first and said second substrates relative to each other to place said fiber coupling port in contact with or near said waveguide coupling port to allow for evanescent optical coupling between a guided optical mode in said fiber and a guided optical mode in said waveguide.

14. The method as in claim 13, further comprising providing a diffraction grating to assist optical coupling between said fiber and said waveguide.

15. The method as in claim 13, further comprising forming at least one buffer layer in said elongated groove between said substrate and said fiber to reduce a mechanical or thermal stress between said fiber and said substrate.

16. The method as in claim 13, further comprising forming another waveguide in said second substrate which is optically coupled to said waveguide to exchange optical energy between said fiber and said another waveguide through said waveguide.

17. A device, comprising:
    a waveguide substrate;
    an optical waveguide formed in said waveguide substrate and configured to have input and output waveguide coupling ports at two different positions for evanescently coupling energy into and out of said waveguide;
    an input fiber-waveguide coupler engaged to an input fiber to receive input light from said input fiber and engaged to said waveguide to couple said input light into said waveguide;
    an output fiber-waveguide coupler engaged to an output fiber and coupled a position in said waveguide to receive said input light in said waveguide to produce output light in said output fiber,
    wherein each fiber-waveguide coupler includes a substrate to form an elongated groove in which a portion of said input or output fiber is engaged, and wherein cladding of said portion is removed to form a fiber coupling port for evanescent optical coupling;
    a first optical grating disposed and configured to assist coupling between said fiber and said input waveguide coupling port; and
    a second optical grating disposed and configured to assist coupling between said fiber and said output waveguide coupling port, wherein said waveguide between said input and output fiber-waveguide couplers includes a semiconductor gain section configured to amplify said input light.

18. The device as in claim 17, wherein said semiconductor gain section includes a multiple quantum well structure.

19. The device as in claim 17, wherein said first optical grating is formed in said waveguide.

20. The device as in claim 17, wherein said first optical grating is formed in said fiber.

21. The device as in claim 17, further comprising an overlay layer between said input waveguide coupling port and said fiber in which said first optical grating is formed.

22. The device as in claim 17, further comprising a light absorber at an end of said waveguide to absorb light in said waveguide that passes through said output fiber-waveguide coupler.

23. The device as in claims 17, wherein each fiber-waveguide coupler includes a substrate to form an elongated groove with one through hole penetrating said substrate and formed on one end, and said input or output fiber is engaged to said substrate by passing through said one through hole to have a portion laid in said elongated groove.

24. A device, comprising:
a waveguide substrate;
an optical waveguide formed in said waveguide substrate and configured to have input and output waveguide coupling ports at two different positions for evanescently coupling energy into and out of said waveguide;
an input fiber-waveguide coupler engaged to an input fiber to receive input light from said input fiber and engaged to said waveguide to couple said input light into said waveguide;
an output fiber-waveguide coupler engaged to an output fiber and coupled a position in said waveguide to receive said input light in said waveguide to produce output light in said output fiber,
wherein each fiber-waveguide coupler includes a substrate to form an elongated groove in which a portion of said input or output fiber is engaged, and wherein cladding of said portion is removed to form a fiber coupling port for evanescent optical coupling;
a first optical grating disposed and configured to assist coupling between said fiber and said input waveguide coupling port; and
a second optical grating disposed and configured to assist coupling between said fiber and said output waveguide coupling port, wherein each fiber-waveguide coupler includes a substrate to form an elongated groove with two through holes penetrating said substrate and formed on both ends, and said input or output fiber is engaged to said substrate by passing through both said through holes to have a portion laid in said elongated groove.

25. A device, comprising:
a first waveguide substrate fabricated to support a first optical waveguide which is configured to have a first waveguide coupling port to allow evanescent coupling into and out of said first waveguide along a direction transverse to said first waveguide;
a second waveguide substrate fabricated to support a second optical waveguide which is configured to have a second waveguide coupling port to allow evanescent coupling into and out of said second waveguide along a direction transverse to said second waveguide; and
a fiber-waveguide coupler having a base substrate with a first surface and a second opposing surface and a fiber engaged to said base substrate to have a first fiber portion over said first surface and a second fiber portion on said second surface, each of said first and said second fiber portions has a fiber coupling port to allow for evanescently coupling optical energy into or out of said fiber wherein said fiber-waveguide coupler is positioned between said first and said second waveguide substrates so that said first waveguide coupling port and said first fiber portion face each other to allow for evanescent coupling therebetween, and said second waveguide coupling port and said second fiber portion face each other to allow for evanescent coupling there between.

26. The device as in claim 25, further comprising:
a first grating formed between said first waveguide coupling port and said first fiber portion to assist optical coupling; and
a second grating formed between said second waveguide coupling port and said second fiber portion to assist optical coupling.

27. The device as in claim 25, wherein said first waveguide substrate further comprises an additional waveguide that is optically coupled to said first optical waveguide.

28. A device, comprising:
a first module having a first substrate and an optical fiber, said first substrate comprising (1) first and second opposing substrate surfaces, and (2) an elongated groove formed over said first substrate surface, wherein said optical fiber has a first fiber portion engaged in said elongated groove, and fiber cladding of said first fiber portion is removed to form a fiber coupling port for evanescently coupling energy into or out of said optical fiber;
a second module positioned adjacent to said first module, said second module having a second substrate which is configured to support a planar waveguide, said planar waveguide having a coupling port interfaced with said fiber coupling port for evanescent coupling between said optical fiber and said planar waveguide; and
an optical grating positioned to assist optical coupling between said optical fiber and said planar waveguide, wherein said first substrate includes a first opening located at a first end of said elongated groove and formed through said first substrate to extend between said first and second substrate surfaces, and wherein said optical fiber passes through said first opening to have a second fiber portion positioned over said second substrate surface.

29. The device as in claim 28, wherein said optical grating is formed in said planar waveguide.

30. The device as in claim 28, wherein said optical grating is formed in said fiber.

31. The device as in claim 28, wherein said optical grating is formed between said fiber and said planar waveguide.

32. The device as in claim 28, wherein said first substrate further includes a second opening located at a second end of said elongated groove and formed through said first substrate to extend between said first and second substrate surfaces, and wherein said optical fiber further passes through said second opening to have a third fiber portion positioned over said second substrate surface.

33. The device as in claim 28, further comprising at least one buffer layer in said first elongated groove between said first substrate and said fiber to reduce a mechanical or thermal stress.

34. The device as in claim 28, further comprising an optical switch having first and second input ports and first and second output ports, said first input port coupled to a first end of said optical fiber and said first output port coupled to a second end of said optical fiber, wherein said optical switch is operable to connect said first input port to said first output port in one operating state and to connect said first input port to said second output port and said second input port to said first output port in a second operating state.

35. A device, comprising:
- a first module having a first substrate and an optical fiber, said first substrate comprising first and second opposing substrate surfaces, and (2) first and second elongated groove formed over said first substrate surface, wherein said optical fiber has a first fiber portion engaged in said first elongated groove and a second fiber portion engaged in said second elongated groove, wherein fiber claddings of said first and said second fiber portions are removed to form first and second fiber coupling ports, respectively for evanescently coupling energy into or out of said optical fiber;
- a second module positioned adjacent to said first module, said second module having a second substrate which is configured to support a planar waveguide, said planar waveguide having a first waveguide coupling port interfaced with said first fiber coupling port and a second waveguide coupling port interfaced with said second fiber coupling port, both for evanescent coupling between said optical fiber and said planar waveguide, wherein said first substrate has a third elongated groove on said second substrate surface to engage a third fiber portion and said adjustable element is formed over or in said third fiber portion; and
- an adjustable element formed in either said fiber between said first and second fiber coupling ports or said planar waveguide between said first and said second waveguide coupling ports, and configured to produce a change in light guided in said fiber or said planar waveguide in response to an external control signal.

36. The device as in claim 35, further comprising:
- a first optical grating positioned to assist optical coupling between said first waveguide coupling port and said first fiber coupling port; and
- a second optical grating positioned to assist optical coupling between said second waveguide coupling port and said second fiber coupling port.

37. The device as in claim 35, wherein said adjustable element includes an adjustable optical grating.

38. The device as in claim 35, wherein said adjustable element includes a material whose refractive index changes in response to said external control signal.

39. The device as in claim 35, wherein an opening is formed at one end of each elongated groove and penetrates through said first substrate, and wherein said fiber passes through said opening to have a fiber portion positioned over said second substrate surface.

* * * * *